United States Patent
Stodilka et al.

(12) 
(10) Patent No.: US 6,740,883 B1
(45) Date of Patent: May 25, 2004

(54) APPLICATION OF SCATTER AND ATTENUATION CORRECTION TO EMISSION TOMOGRAPHY IMAGES USING INFERRED ANATOMY FROM ATLAS

(76) Inventors: Robert Z. Stodilka, 424 The Kingsway, Etobicoke, Ontario M9A 3W1 (CA); Frank S. Prato, 408 Briarhill Avenue, London, Ontario N5Y 1P2 (CA); Brad J. Kemp, 1346 19th Ave. SW., Rochester, MN (US) 55902; Richard L. Nicholson, 7 Sir Robert Place, Arva, Ontario N0M 1C0 (CA)

( * ) Notice: Subject to any disclaimer, the term of this patent is extended or adjusted under 35 U.S.C. 154(b) by 0 days.

(21) Appl. No.: 09/744,663
(22) PCT Filed: Aug. 13, 1999
(86) PCT No.: PCT/CA99/00751
§ 371 (c)(1),
(2), (4) Date: Mar. 23, 2001
(87) PCT Pub. No.: WO00/10034
PCT Pub. Date: Feb. 24, 2000

Related U.S. Application Data
(60) Provisional application No. 60/096,649, filed on Aug. 14, 1998.

(51) Int. Cl.[7] .............................................. G01T 1/164
(52) U.S. Cl. ........................... 250/363.04; 250/363.03; 250/369
(58) Field of Search ..................... 250/363.04, 363.03; 250/369; 128/922; 382/131

(56) References Cited

U.S. PATENT DOCUMENTS

| | | | |
|---|---|---|---|
| 5,376,795 A | * 12/1994 | Hasegawa et al. | 250/363.04 |
| 5,376,796 A | * 12/1994 | Chan et al. | 250/363.04 |
| 6,539,103 B1 | * 3/2003 | Panin et al. | 382/131 |

OTHER PUBLICATIONS

Jesper L.R. Andersson, Anders Sundin and Sven Valind, "A Method of Coregistration of PET and MR Brain Images", (1995) The Journal of Nuclear Medicine, vol. 36, No. 7, pp. 1307–1315.

Jesper L.R. Andersson, Bengt E. Vagnhammar and Harald Schneider, "Accurate Attenuation Correction Despite Movement during PET Imaging", (1995) The Journal of Nuclear Medicine, vol. 36, No. 4, pp. 670–678.

Jesper L.R. Andersson, "A Rapid and Accurate Method to Realign PET Scans Utilizing Image Edge Information", (1995) The Journal of Nuclear Medicine, vol. 36, No. 4, pp. 657–669.

D. Bakker and E.K.J. Pauwels, "Stroke: the role of functional imaging", (1997) European Journal of Nuclear Medicine, vol. 24, No. 1, pp. 2–5.

M. Bergstrom, J. Litton, L. Eriksson, C. Bohm and G. Blomqvist, "Determination of Object Contour from Projections for Attenuation Correction in Cranial Positron Emission Tomography", (1982) Journal of Computer Assisted Tomography, vol. 6, No. 2, pp. 365–372.

(List continued on next page.)

Primary Examiner—Constantine Hannaher
Assistant Examiner—Shun Lee
(74) Attorney, Agent, or Firm—Baker & Daniels

(57) ABSTRACT

A method of applying scatter and attenuation correction to emission tomography images of a region of interest of a patient under observation comprises the steps of aligning a three-dimensional computer model representing the density distribution within the region of interest with the emission tomography images. The computer model is created from image data of other subjects thereby to avoid the need to image the subject under observation to create the computer model. Scatter and attenuation correction is applied to the emission tomography images using the aligned computer model as a guide.

60 Claims, 13 Drawing Sheets

OTHER PUBLICATIONS

M. Bergstrom, L. Eriksson, C. Bohm, G. Blomqvist, and J. Litton, "Correction for Scattered Radiation in a Ring Detector Positron Camera by Integral Transformation of the Projections", (1983) Journal of Computer Assisted Tomography, vol. 7, No. 1, pp. 42–50.

Dale L. Bailey, Brian F. Hutton, and Paul J. Walker, "Improved SPECT Using Simultaneous Emission and Transmission Tomography", (1987) The Journal of Nuclear Medicine, vol. 28, No. 5, pp. 844–851.

James E. Bosher, Valen E. Johnson, Timothy G. Turkington, Ronald J. Jaszczak, Carey E. Floyd, Jr. and R. Edward Coleman, "Bayesian Reconstruction and Use of Anatomical A Priori Information for Emission Tomography", (1996) IEEE Transactions on Medical Imaging, vol. 15, No. 5, pp. 673–686.

T.F. Budinger and G.T. Gullberg, "Transverse Section Reconstruction of Gamma–Ray Emitting Radionuclides in Patients", (1977), In: Ter–Pogossian MM, Phelps ME, Brownell GL, eds, Reconstruction tomography in diagnostic radiology and nuclear medicine Baltimore: University Park Press, pp. 315–342.

H. Chabriat, M. Levasseur, M. Vidailhet, C. Loc'h, B. Maziere, M.H. Bourguignon, A.M. Bonnet, M. Zilbovicius, C. Raynaud, Y. Agid, A. Syrota and Y. Samson, "In–Vivo SPECT Imaging of D2 Receptor with Iodine–Iodolisuride: Results in Supranuclear Palsy", (1992) Journal of Nuclear Medicine, vol. 33, No. 8, pp. 1481–1485.

Karen H. Chan, Keith A. Johnson, J. Alex Becker, Andrew Satlin, Jack Mendelson, Basem Garada and B. Leonard Holman, "A Neural Network Classifier for Cerebral Perfusion Imaging", (1994) Journal of Nuclear Medicine, vol. 35, No. 5, pp. 771–774.

J.J. Claus, F. vanHarskamp, M.M.B. Breteler, E.P. Krenning, T.J.M. van der Cammen, A. Hofman, D. Hasan, "Assessment of crebral perfusion with single–photon emission tomography in normal subjects and in patients with Alzheimer's disease: effects of region of interest selection", (1994) European Journal of Nuclear Medicine, vol. 21, No. 10, pp. 1044–1051.

Rui J.P. DeFigueiredo, W. Rodman Shankle, Andrea Maccato, Malcolm B. Dick, Prashanth Mundkur, Ismael Mena, and Carl W. Cotman, "Neural–network–based classification of cognitively normal, demented Alzheimer disease and vascular dementia from single photon emission with computed tomography image data from brain", (1995) Proc. Natl. Acad. Sci. USA, vol. 92, pp. 5530–5534.

Stefan Eberl, Iwao Kanno, Roger R. Fulton, Anneke Ryan, Brian F. Hutton, and Michael J. Fulham, "Automated Interstudy Image Registration Technique for SPECT and PET", (1996) The Journal of Nuclear Medicine, vol. 37, No. 1, pp. 137–145.

A.C. Evans, C. Beil, S. Marrett, C.J. Tompson, and A. Hakim, "Anatomical–Functional Correlation Using an Adjustable MRI–Based Region of Interest Atlas with Positron Emission Tomography", (1988) Journal of Cerebral Blood Flow and Metabolis, vol. 8, No. 4, pp. 513–530.

Carey E. Floyd, Jr., Ronald J. Jaszczak, Kim L. Greer, and R. Edward Coleman, "Deconvolution of Compton Scatter", (1985) The Journal of Nuclear Medicine, vol. 26, No. 4, pp. 403–408).

Eric C. Frey, Benjamin M.W. Tsui, and J. Randolph Perry, "Simultaneous Acquisition of Emission and Transmission Data for Improved Thallium–201 Cardiac SPECT Imaging Using a Technetium–99m Transmission Source", (1992) The Journal of Nuclear Medicine, vol. 33, No. 12, pp. 2238–2245.

Carl K. Hoh, Magnus Dahlbom, Greg Harris, Yong Chol, Randall A. Hawkins, Michael E. Phelps and Jamshid Maddahi, "Automated Iterative Three–Dimensional Registration of Positron Emission Tomography Images", (1993) The Journal of Nuclear Medicine, vol. 34, No. 11, pp. 2009–2018.

B. Leonard Holman, Robert E. Zimmerman, Keith A. Johnson, Paulo A. Carvalho, Richard B. Schwartz, Jay S. Loeffler, Eben Alexander, Charles A. Pelizzari and George T.Y. Chen, "Computer–Assisted Superimposition of Magnetic Resonance and High–Resolution Technetium–99m–HMPAO and Thallium–201 SPECT Images of the Brain", (1991) The Journal of Nuclear Medicine, vol. 32, No. 8, pp. 1478–1484.

Minoru Hosoba, Hidenobu Wani, Hinako Toyama, Hajime Murata, and Elichi Tanaka, "Automated Body Contour Detection in SPECT: Effects on Quantitative Studies", (1986) The Journal of Nuclear Medicine, vol. 27, No. 7, pp. 1184–1191.

Sung–Cheng Huang, Edward J. Hoffman, Michael E. Phelps, and David E. Kuhl, "Quantitation in Positron Emission Computed Tomography: 2. Effects of Inaccurate Alteration Correction" Dec. 1979 Journal of Computer Assisted Tomography 3(6) 804–814.

Sung–Cheng Huang, Richard E. Carson, Michael E. Phelps, Edward J. Hoffman, Heinrich R. Schelbert, and David E. Kuhl, "A Boundary Method for Attenuation Correction in Positron Computed Tomography", (1981) The Journal of Nuclear Medicine, vol. 22, No. 7, pp. 627–637.

H. Malcolm Hudson and Richard S. Larkin, "Accelerated Image Reconstruction Using Ordered Subsets of Projection Data", (1994) IEEE Transactions on Medical Imaging, vol. 13, No. 4, pp. 601–609.

Ronald J. Jaszczak, PhD, Lee–Tzuu Chang, PhD, Neil A. Stein, PhD, and Fergus E. Moore, PhD, "Whole–body Single–photon Emission Computed Tomography using Dual, Large–field–of–view Scintillation Cameras", (1979) Phys. Med. Biol., vol. 24, No. 6, pp. 1123–1143.

Jack E. Juni, "Taking Brain SPECT Seriously: Reflections on Recent Clinical Reports in The Journal of Nuclear Medicine", (1994) The Journal of Nuclear Medicine, vol. 35, No. 12, pp. 1891–1895.

Dan J. Kadrmas, Eric C. Frey and Benjamin M W Tsul, "Analysis of the reconstructibility and noise properties of scattered photons in 99mTc SPECT", (1997) Phys. Med. Biol. , vol. 42, pp. 2493–2516.

H. Karbe, A. Kertesz, J. Davis, B.J. Kemp, F.S. Prato, and R.L. Nicholson, "Quantification of functional deficit in Alzheimer's disease using a computer–assisted mapping program for 99m Tc–HMPAOSPECT", (1994) Neuroradiology, vol. 36, pp. 1–6.

Brad J. Kemp, Frank S. Prato, Richard L. Nicholson and Lionel Reese, "Transmission Computed Tomography Imaging of the Head with a SPECT System and a Collimated Line Source", (1995) The Journal of Nuclear Medicine, vol. 36, No. 2, pp. 328–335.

Kenneth Lange and Richard Carson, "EM Reconstruction Algorithms for Emission and Transmission Tomography", (1984) Journal of Computer Assisted Tomography, vol. 8, No. 2, pp. 306–316.

Niels A. Lassen, Allan R. Andersen, Lars Friberg and Olaf B. Paulson, "The Retention of [99m Tc]–d,l–HM–PAO in the Human Brain after Intracarotid Bolus Injection: A Kinetic Analysis", (1988) Journal of Cerebral Blood Flow and Metabolism, vol. 8, Suppl. 4, pp. S13–S–22.

Jean Leveille, George Demonceau, and Richard C. Walovitch, "Intrasubject Comparison Between Technetium–99m–ECD and Technetium–99m–HMPAO in Healthy Human Subjects", (1992) The Journal of Nuclear Medicine, vol. 33, No. 4, pp. 480–484.

Jean–Francois Mangin, Vincent Frouin, Isabelle Bloch, Bernard Bendriem, and Jaime Lopez–Krah, "Fast Nonsupervised 3D Registration of PET and MR Images of the Brain", (1994) Journal of Cerebral Blood Flow and Metabolism, vol. 14, No. 5, pp. 749–762.

J.A. Malko, R.L. Van Heertum, G.T. Gullberg, and W.P. Kowalsky, "SPECT Liver Imaging Using an Iterative Attenuation Correction Algorithm and an External Flood Source", (1986) The Journal of Nuclear Medicine, vol. 27, No. 5, pp. 702–705.

A. R. McIntosh, F.L. Bookstein, J.V. Haxby, and C.L. Grady, "Spatial Pattern Analysis of Functional Brain Images Using Partial Least Squares", (1996) Neuroimage, vol. 3, pp. 143–157.

Miles E. McCord, Stephen L. Bacharach, Robert O. Bonow, Vaskin Dilsizian, Alberto Cuocolo, and Nanette Freedman, "Misalignment Between PET Transmission and Emission Scans: Its Effect on Myocardial Imaging", (1992) The Journal of Nuclear Medicine, vol. 33, No. 6, pp. 1209–1213.

Steven R. Melkle, Magnus Dahlbom and Simon R. Cherry, "Attenuation Correction Using Count–Limited Transmission Data in Positron Emission Tomography", (1993) The Journal of Nuclear Medicine, vol. 34, No. 1, pp. 143–144.

Steven R. Melkle, Brian F. Hutton and Dale L. Bailey, "A Transmission–Dependent Method for Scatter Correction in SPECT", (1994) The Journal of Nuclear Medicine, vol. 35, No. 2, pp. 360–367.

Ruediger Mielke, Uew Pietrzyk, Andreas Jacobs, Gereon R. Fink, Atsuschi Ichimiya, Josef Kessler, Karl Herholz, Wolf D. Heiss, "HMPAO SPET and FDG PET in Alzheimer's disease and vascular dementia: comparison of perfusion and metabolic pattern", (1994) European Journal of Nuclear Medicine, vol. 21, No. 10, pp. 1052–1060.

Satoshi Minoshima, Kevin L. Berger, Kien S. Lee, and Mark A. Mintun, "An Automated Method for Rotational Correction and Centering of Three–Dimensional Functional Brain Images", (1992) The Journal of Nuclear Medicine, vol. 33, No. 8, pp. 1579–1585.

Satoshi Minoshima, Robert A. Koeppe, Kirk A. Frey and David E. Kuhl, "Anatomic Standardization: Linear Sealing and Nonlinear Warping of Functional Brain Images", (1994) The Journal of Nuclear Medicine, vol. 35, No. 9, pp. 1528–1537.

Frank Natterer, "Determination of tissue attenuation in emission tomography of optically dense media", (1993) Inverse Problems, vol. 9, pp. 731–736.

J.A. Nelder, R. Mead, (1965), "A Simplex Method for Function Minimization", The Computer Journal, vol. 7, pp. 308–313.

Patrick Tan, Dale L. Bailey, Steven R. Meikle, Stefan Eberl, Roger R. Fulton, Brian F. Hutton, "A Scanning Line Source for Simultaneous Emission and Transmission Measurement in SPECT", (1993), The Journal of Nuclear Medicine, vol. 34, No. 10, pp. 1752–1760.

M.M. Ter–Pergossian, "Misalignment Between PET Transmission and Emission Scans: Effect on Myocardial Imaging", (1992), The Journal of Nuclear Medicine, vol. 33, No. 6, pp. 1214–1215.

Benjamin N.W. Tsui, Grant T. Gullberg, Eric R. Edgerton, J. Glen Ballard, J. Randolph Perry, William H. McCartney, Jan Berg, "Correction of Nonuniform Attenuation in Cardiac SPECT Imaging", (1989), The Journal of Nuclear Medicine, vol. 30, No. 4, pp. 497–507.

Chi–Hua Tung, Grant T. Gullberg, "A Submission of Emission and Transmission Noise Propagation in Cardiac SPECT Imaging With Nonuniform Attenuation Correction", (1994), Medical Physics, vol. 21, No. 10, pp. 1565–1576.

S. Webb, M.A. Floer, R.J. Ou, M.O. Leach, "A Comparison of Attenuation Correction Methods for Quantitative Single Photon Emission Computed Tomography", (1983), Phys. Med. Biol., vol. 28, No. 9, pp. 1045–1056.

Roger P. Woods, Simon R. Cherry, John C. Mazziotta, (1992), "Rapid Automated Algorithm for Aligning and Reslicing PET Images", Journal of Computer Assisted Tomography, vol. 16, No. 4, pp. 620–633.

Roger P. Woods, John C. Mazziotta, Simon R. Cherry, "MRI:–PET Registration With Automated Algorithm", (1993), Journal of Computer Assisted Tomography, vol. 17, No. 4, pp. 536–546.

Eddie Zhihua Xu, Nizar A. Mullani, K. Lance Gould, Wallace L. Anderson, "A Segmented Attenuation Correction for PET", (1991), The Journal of Nuclear Medicine, vol. 32, No. 1, pp. 161–165.

I. George Zubal, Susan S. Spencer, Khursheed Imam, John Seibyl, Eileen O. Smith, Gary Wisniewski, Paul B. Hoffer, (1995), The Journal of Nuclear Medicine, vol. 36, No. 4, pp. 684–689.

I. George Zubal, Charles R. Harrell, Eileen O. Smith, Zachary Rattner, Gene Gindi, Paul B. Hoffer, (1994), Medical Physics, vol. 21, No. 2, pp. 299–302.

Charles A. Pelizzari, George T.Y. Chen, Danny R. Spelbring, Ralph R. Weichselbaum, Chin–Tu Chen, "Accurate Three–Dimensional Registration of CT, PET, and/or MR Images of the Brain", (1989), Journal of Computer Assisted Tomography, vol. 13, No. 1, pp. 20–26.

Robert L. Phillips, Eythe D. London, Jonathan M.Links, Nicola G. Cascella, "Program for PET Image Alignment: Effects on Calculated Differendes in Cerebral Metabolic Rates for Glucose", (1990), The Journal of Nuclear Medicine, vol. 31, No. 12, pp. 2052–2057.

Uwe Pietrzyk, Karl Herholz, Gereon Fink, Andreas Jacobs, Rudiger Mielke, Ina Slansky, Michael Wurker, Wolf–Dieter Heiss, "An Interactive Technique for Three–Dimensional Image Registration: Validiation for PET, SPECT, MRI and CT Brain Studies", (1994), The Journal of Nuclear Medicine, vol. 35, No. 12, pp. 2011–2018.

M.S. Rosenthal, J. Cullom, W. Hawkins, S.C. Moore, B.M.W. Tsui, M. Yester, "Quantitative SPECT Imaging: A Review and Recommendations by The Focus Committee of the Society of Nuclear Medicine Computer and Instrumentation Council", (1995), The Journal of Nuclear Medicine, vol. 36, No. 8, pp. 1489–1513.

John P. Seibyl, Scott W. Woods, Sami S. Zoghbi, Ronald M. Baldwin, Holley M. Dey, Andrew W. Goddard, Yolanda Zea–Ponce, George Zubal, Mark Germine, Eileen O. Smith, George R. Heninger, Dennis S. Charney, Hank F. Kung, Abass, Alavi, Paul B. Hoffer and Robert B. Innis, Dynamic SPECT Imaging of Dopamine D2 Receptors in Human Subjects with Iodine–123–IBZM, (1992), The Journal of Nuclear Medicine, vol. 33, No. 11, pp. 1964–1971.

L.A. Shepp, Y. Vardi, "Maximum Likelihood Reconstruction for Emission Tomography", (1982), IEEE Transactions on Medical Imaging, vol. MI–1, No. 2, pp. 113–122.

Plotr J. Slomka, Gilbert A. Hurwitz, Janice Stephenson, Trevor Cradduck, "Automated Alignment and Sizing of Myocardial Stress and Rest Scans to Three–Dimensional Normal Templates Using an Image Registration Algorithm", (1995), The Journal of Nuclear Medicine, vol. 36, No. 6, pp. 1115–1122.

S.L. Bacharach et al.: "Attenuation correction in cardi" Journal of Nuclear Cardiology, vol. 2, No. 3, Jun. 1995 (1995–06), pp. 246,255.

* cited by examiner

Figure 1
Patient data
A
SPECT scan without scatter and attenuation correction
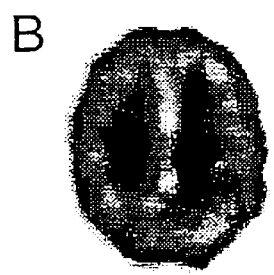
B
SPECT scan axial slice
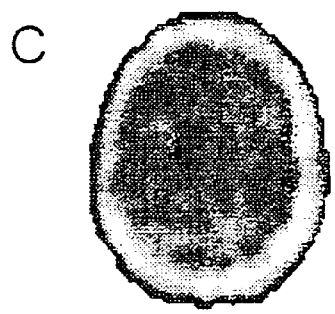
C
Transmission scan axial slice
D
Appurtenant anatomy for scatter and attenuation correction (sagittal)
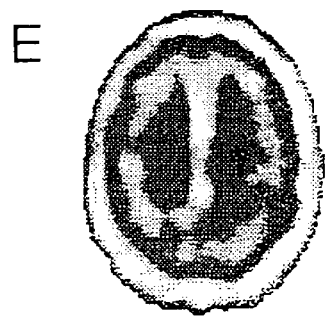
E
Appurtenant anatomy for scatter and attenuation correction (transverse)

Figure 3
Phantom data

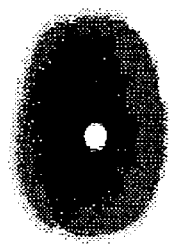

A

SPECT scan (transverse)

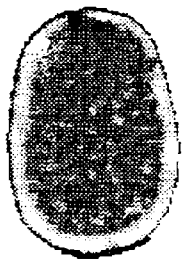

B

Transmission scan (transverse)

C

Appurtenant anatomy for scatter and attenuation correction (sagittal)

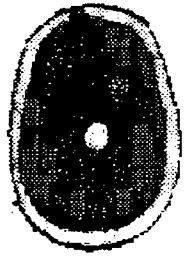

D

Appurtenant anatomy for scatter and attenuation correction (transverse)

E

Inferred anatomy for scatter and attenuation correction (sagittal)

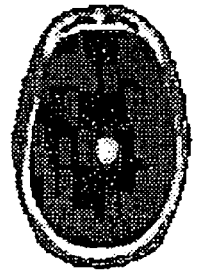

F

Inferred anatomy for scatter and attenuation correction (transverse)

(A) Mid-cortical and (B) cerebellar transverse slices.
Volume enclosed by brain contour (white), appurtenant
anatomy (gray), and inferred anatomy (black).

Both the brain contour and uniform inferred anatomy differ from appurtenant anatomy. Here, this difference (in pixels) is plotted as a function of transverse slice.

Sagittal slice through (A) appurtenant anatomy and
(B) inferred anatomy. The (appurtenant) brain contour
is shown as the thick black outline in both (A) and (B).

Figure 7

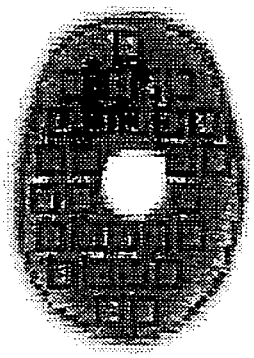

SPECT scan of the head phantom. (transverse slice) Black squares in (A) are a subset of the two-hundred macrovoxels defined in the reconstructed volume. The macrovoxels are used in the error metrics defined below.

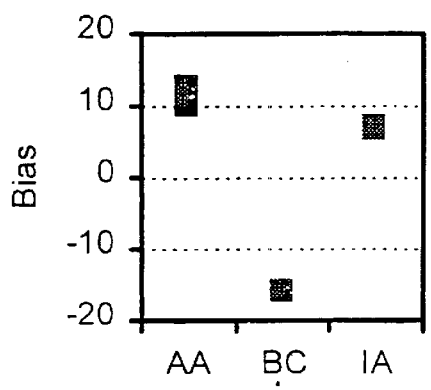

Global bias, shown in (B), was defined as [(mean macrovoxel activity/calibration)-1]*100%. Data is shown for appurtenant anatomy (AA), braincontour (BC), and inferred anatomy (IA). Uniform corrections are shown in gray, and non-uniform in black.

Global uniformity, shown in (C), was defined as [(coefficient of variation of macrovoxels)*100%]. Data is shown for appurtenant anatomy (AA), braincontour (BC), and inferred anatomy (IA). Uniform corrections are shown in gray, and non-uniform in black.

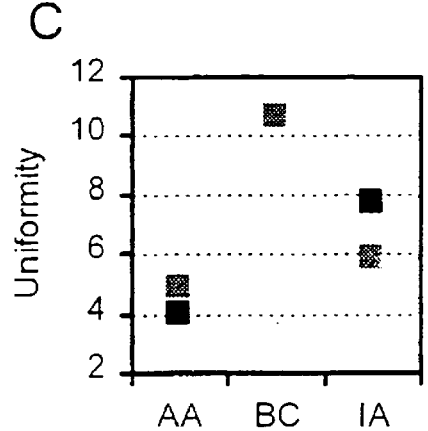

Figure 8

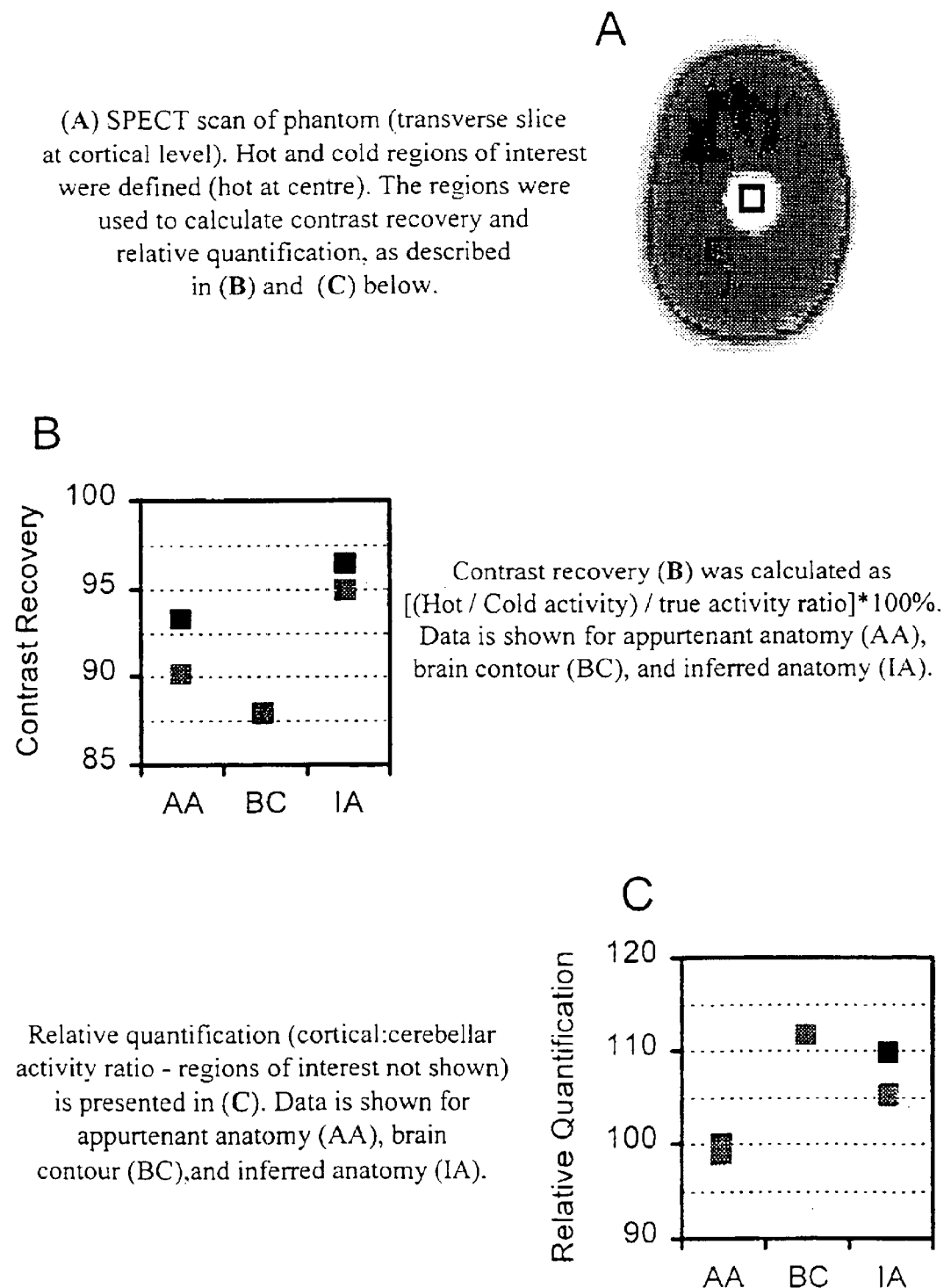

(A) SPECT scan of phantom (transverse slice at cortical level). Hot and cold regions of interest were defined (hot at centre). The regions were used to calculate contrast recovery and relative quantification, as described in (B) and (C) below.

Contrast recovery (B) was calculated as [(Hot / Cold activity) / true activity ratio]*100%. Data is shown for appurtenant anatomy (AA), brain contour (BC), and inferred anatomy (IA).

Relative quantification (cortical:cerebellar activity ratio - regions of interest not shown) is presented in (C). Data is shown for appurtenant anatomy (AA), brain contour (BC), and inferred anatomy (IA).

Figure 9

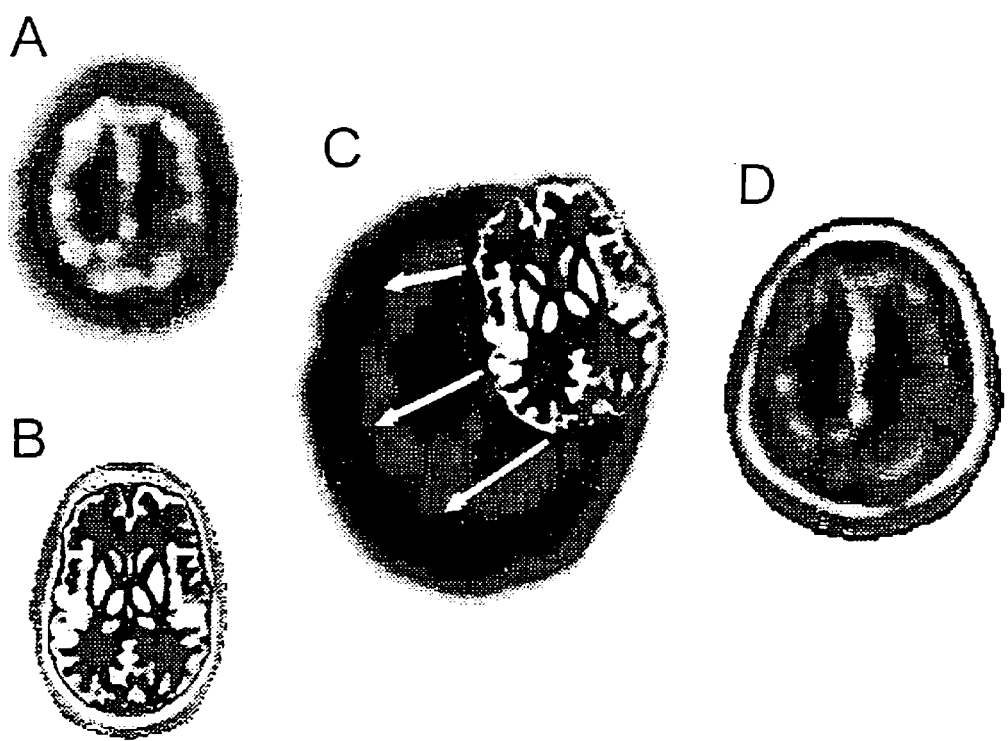

The Inferred Anatomy algorithm requires a patient's preliminary reconstruction (A) and a head atlas (B). The preliminary reconstruction does not include scatter and attenuation correction. The head atlas consists of a functional component (brain), and an anatomical component (extra-cerebral tissue). The functional component is then spatially registered to the preliminary reconstruction (C), and this optimal transformation is recorded. The patient's anatomy is then inferred by applying the same transformation to the anatomical component of the head atlas (D).

Examples of a patient's SPECT scan (brain) superimposed onto the pertinent transmission reconstruction (A and C, extra-cerebral tissue) and Inferred Anatomy (B and D, extra-cerebral tissue). The reconstruction includes scatter and attenuation correction guided by either the transmission reconstruction or Inferred Anatomy.

Profiles (B) through reconstructions at the cortical-axial level (A) comparing a SPECT reconstruction guided by the pertinent transmission scan (solid) with the reconstruction guided by Inferred Anatomy (dots). The profiles were taken between the two arrows in A.

Figure 12

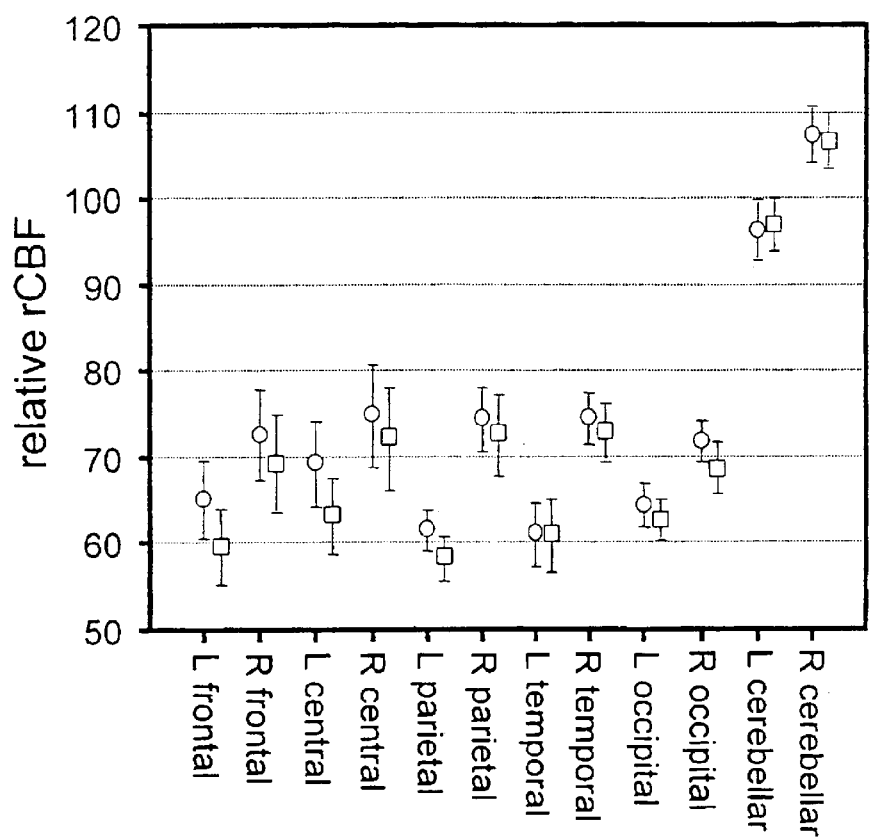

Regional ceebral blood flow with voxel-by-voxel Lassen's correction, relative to the cerebellum is shown for the twelve bilateral regions-of-interest. Means and standard errors are calculated across the ten patients. The quantification follows scatter and attenuation correction guided by transmission reconstructions (circles) or Inferred Anatomy (squares).

Figure 13

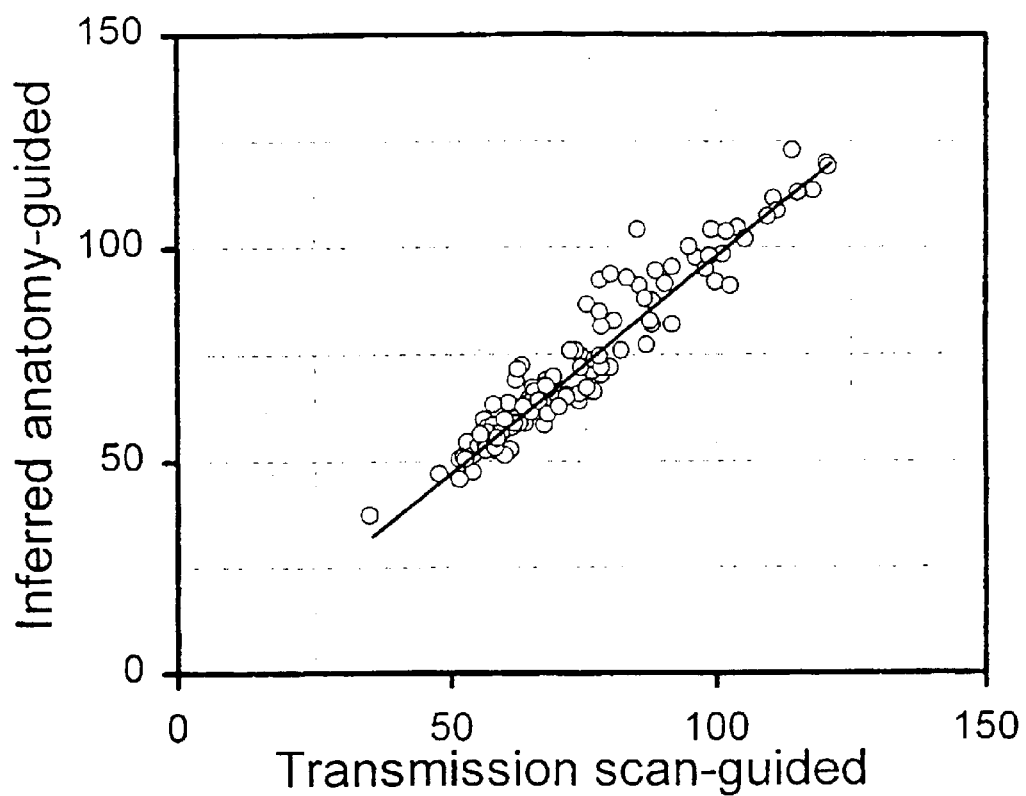

Comparison of reconstructions guided by transmission scans (abscissa), with reconstructions guided by Inferred Anatomy (ordinate). 120 data points are shown; these are from twelve regions-of-interest and ten patients. Each point represents regional cerebral blood flow with Lassen's correction, relative to the cerebellum. The equation of the line-of-best-fit is y=1.02x-3.83, and the correlation coefficient squared is $r^2=0.92$ ($p \ll 0.0001$).

APPLICATION OF SCATTER AND ATTENUATION CORRECTION TO EMISSION TOMOGRAPHY IMAGES USING INFERRED ANATOMY FROM ATLAS

CROSS-REFERENCE TO RELATED APPLICATION

The present application claims the benefit of U.S. Provisional Patent Application No. 60/096,649 filed on Aug. 14, 1998.

TECHNICAL FIELD

The present invention relates to emission tomography and in particular to a method and apparatus for applying scatter and attenuation correction to emission tomography images using anatomy inferred from an atlas.

BACKGROUND ART

Single Photon Emission Computed Tomography (SPECT) and Positron Emission Tomography (PET) are nuclear medicine diagnostic imaging techniques used to measure the three-dimensional distribution of a radiopharmaceutical within the body. Brain SPECT and PET imaging techniques are primarly used to measure regional cerebral blood flow in a patient injected with a radiopharmaceutical to assist in the evaluation of stroke and the diagnosis of dementias such as Alzheimer's disease.

Although SPECT and PET are useful imaging techniques, their poor quantitative accuracy has been an obstacle in the ability to achieve increased diagnostic reliability. Quantitative accuracy of brain SPECT and PET imaging has however been improved significantly through the application of scatter and attenuation correction to SPECT and PET brain images. To be sufficiently accurate, the application of scatter and attenuation correction to SPECT and PET brain images must be guided by the distribution of density within the head. Unfortunately, the distribution of density within the head cannot be obtained from SPECT and PET brain scans and therefore, separate measurements are required.

Transmission imaging has been used to measure the distribution of density within the head to allow scatter and attenuation correction to be applied to SPECT and PET brain images. Unfortunately, the hardware necessary for making transmission measurements is complex, unreliable and requires extensive maintenance. Also, the need to make transmission imaging measurements in addition to the SPECT or PET brain images, increases the time required to complete the overall imaging procedure. SPECT and PET imaging procedures are themselves lengthy and require a patient to remain motionless to ensure accurate brain images. For sick and elderly patients, this is a difficult task. Adding to the length of the imaging procedure increases the likelihood that patients will not remain motionless. Movement of a patient during the transmission imaging procedure results in inaccurate measurements of the distribution of density within the head. This of course provides an inaccurate guide for the application of scatter and attenuation correction to SPECT and PET brain images. Accordingly, improved methods to increase the diagnostic reliability of emission tomography images are desired.

It is therefore an object of the present invention to provide a novel method and apparatus for applying scatter and attenuation correction to emission tomography images.

DISCLOSURE OF THE INVENTION

Broadly stated, the present invention provides a method and apparatus for applying scatter and attenuation correction to emission tomography images which estimates or "infers" the distribution of density within a region of interest of a patient under observation using a three-dimensional computer model of the region of interest. It has been found that scatter and attenuation correction guided by a computer model of the region of interest under observation produces results similar to those when using transmission images of the actual region of interest as the guide to the application of scatter and attenuation correction.

According to one aspect of the present invention there is provided a method of applying scatter and attenuation correction to emission tomography images of a region of interest of a subject under observation comprising the steps of:

aligning a three-dimensional computer model representing the density distribution within said region of interest with said emission tomography images; and applying scatter and attenuation correction to said emission tomography images using said aligned computer model as a guide.

In a preferred embodiment, the computer model is in the form of a two-component atlas. During the aligning step, a functional component of the atlas is firstly aligned with the emission tomography images to generate a set of spatial transformation parameters. Following this, an anatomical component of the atlas is aligned with the emission tomography images using the set of spatial transformation parameters.

The atlas may be selected from a database of atlases based on degree of registration with the emission tomography images. Alternatively, multiple atlases maybe combined to yield a resultant atlas which better registers with the emission tomography images.

According to another aspect of the present invention there is provided in an emission tomography imaging system where emission tomography images of a region of interest of a subject are taken for analysis and are corrected for scatter and attenuation, the improvement comprising:

using a three-dimensional computer model approximating the density distribution within the region of interest as a guide to the application of scatter and attenuation correction.

According to still yet another aspect of the present invention there is provided an emission tomography image processing system comprising:

memory storing emission tomography images of a region of interest of a subject;

said memory also storing at least one three-dimensional computer model of said region of interest, said computer model representing the density distribution within said region of interest; and a processor for registering said computer model with said emission tomography images and for applying scatter and attenuation correction to said emission tomography images using said registered computer model as a guide.

According to still yet another aspect of the present invention there is provided an emission tomography imaging system comprising:

means for taking emission tomography images of a region of interest of a subject to form a three-dimensional image of said region of interest;

memory to store said emission tomography images, said memory also storing at least one three-dimensional computer model of said region of interest, said computer model representing the density distribution within said region of interest; and a processor for aligning said computer model with said emission tomography images and for applying scatter and attenuation correction to said emission tomography images using said aligned computer model as a guide.

According to still yet another aspect of the present invention there is provided a computer readable medium including computer program code for applying scatter and attenuation correction to emission tomography images of a region of interest of a subject, said computer readable medium including:

computer program code for aligning a three-dimensional computer model representing the density distribution within said region of interest with said emission tomography images; and computer program code for applying scatter and attenuation correction to said emission tomography images using said aligned computer model as a guide.

The present invention provides advantages in that by using a three-dimensional computer model of the region of interest of a subject under observation that approximates its density as a guide for the application of scatter and attenuation correction to emission tomography images, the need for transmission imaging is obviated. Therefore, in the case of SPECT and PET imaging, the imaging procedures do not need to be lengthened. Also, since the distribution of density in the region of interest under observation is approximated by a three-dimensional computer model, additional hardware is not required to create the guide for the application of scatter and attenuation correction. This makes the present invention significantly less expensive and more flexible than transmission imaging systems. In addition, since a three-dimensional computer model of the region of interest under observation is used as the guide for the application of scatter and attenuation correction, scatter and attenuation correction can be applied retrospectively to existing databases which include significant numbers of emission tomography images for which no transmission imaging measurements were acquired.

BRIEF DESCRIPTION OF THE DRAWINGS

An embodiment of the present invention will now be described more fully with reference to the accompanying drawings in which:

FIG. 1a shows a two-dimensional emission tomography brain image without the application of scatter and attenuation correction;

FIG. 1b shows the two-dimensional image of FIG. 1a with the application of scatter and attenuation correction;

FIG. 1c is a two-dimensional transmission brain image;

FIGS. 1d and 1e are two-dimensional emission tomography brain images with appurtenant anatomy derived from transmission images applied thereto;

FIG. 3a shows a two-dimensional emission tomography brain image of a head phantom with scatter and attenuation correction;

FIG. 3b is a two-dimensional transmission brain image;

FIGS. 3c and 3d are two-dimensional emission tomography brain images with appurtenant anatomy derived from transmission images applied thereto;

FIGS. 3e and 3f are two-dimensional emission tomography brain images with inferred anatomy derived from an atlas applied thereto;

FIGS. 7 and 8 show quantitative evaluation of head phantom SPECT reconstructions;

FIG. 9 shows two-dimensionl SPECT brain images;

FIG. 12 is a graph showing a comparison of regional cerebral blood flow from reconstructed SPECT images guided by inferred anatomy and transmission scans; and FIG. 13 is a graph showing the correlation between the reconstructed SPECT images of FIG. 12.

BEST MODE FOR CARRYING OUT THE INVENTION

During emission tomography imaging such as for example SPECT and PET, a patient is injected with a radiopharmaceutical. Two-dimensional images or projections of a region of interest (ROI) of a patient are taken along an arbitrary axis. The projections are digitized and conveyed to a computer for storage in a three-dimensional array in computer memory to reconstruct a three-dimensional image of the region of interest. Once the three-dimensional image is reconstructed, two-dimensional slices of the region of interest can be viewed along virtually any arbitrary axis using conventional software. FIG. 1a shows a two-dimensional emission tomography brain image.

During the imaging procedure, the emissions from the radiopharmaceutical are scattered and/or attenuated by different density tissue, air cavities and/or bones in the region of interest under observation. As can be seen in FIG. 1a, scattering and attenuation of radiopharmaceuticals affects quantitative image quality. As a result, acquired emission tomography images are often unreliable. Applying scatter and attenuation correction to emission tomography images, using transmission images of the same region of interest taken during the same imaging procedure, is known but suffers from the disadvantages discussed previously. FIG. 1b shows the two-dimensional image of FIG. 1a with scatter and attenuation correction applied using transmission images taken of the same anatomy. FIG. 1c shows an example of a transmission image and FIGS. 1d and 1e show appurtenant anatomy (sagittal and transverse respectively) derived from the transmission images applied to emission tomography brain images.

In the present invention, a three-dimensional computer model or "atlas" of the region of interest, which provides accurate density distribution of the region of interest, is stored in a database in computer memory and is used as a guide for the application of scatter and attenuation correction to emission tomography images. In the present embodiment, the atlas includes two components, namely a functional component simulating a SPECT OR PET scan of the region of interest and an anatomical component simulating a transmission scan of the region of interest. The atlas can be created from existing transmission images or x-ray CT scans of similar regions of interest from other patients and averaged to form a suitable computer model or atlas. Multiple models for each region of interest and models for different regions of interest can be stored in the database and accessed individually during scatter and attenuation correction of emission tomography images. Since a computer model of the region of interest is used, additional hardware and procedure time is not required to apply scatter and attenuation correction to emission tomography images. An example of the application of scatter and attenuation correction to emission tomography brain images in accordance with the present invention will now be described.

Figure 2:
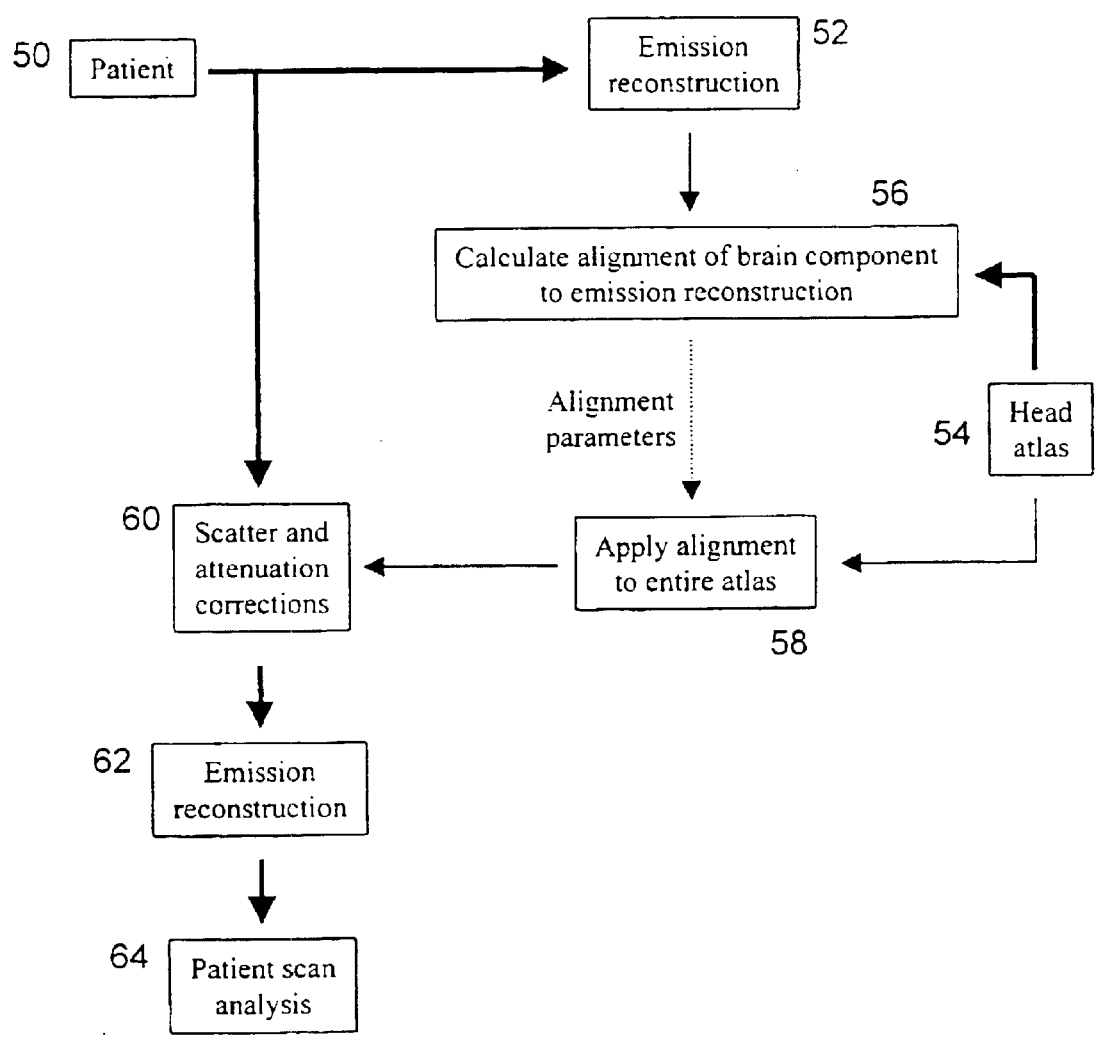
FIG. 2 is a block diagram showing a method for applying scatter and attenuation correction to emission tomography images in accordance with the present invention.

Referring now to FIG. 2, a block diagram illustrating the present method for applying scatter and attenuation correction to emission tomography brain images is shown. Initially, emission tomography brain images of a patient (block 50) are acquired in a known manner. The acquired brain images are in the form of two-dimensional projections of the radiopharmaceutical distribution in the brain.

Initially, a preliminary reconstruction of the acquired brain images is performed to digitize and assemble the two-dimensional projections into a three-dimensional array in computer memory to create a three-dimensional image of the brain (block 52). An atlas of the head (the region of interest in this case) is then downloaded from the database into a datafile (block 54) and the functional component of the head atlas is identified. Once identified, the functional component of the head atlas, in this embodiment the brain component, is copied to a three-dimensional array. Following this, an alignment procedure to register spatially the brain component of the head atlas with the three-dimensional brain image is performed (block 56). In the present embodiment, a simplex algorithm is used to register spatially, the brain component of the head atlas with the brain image as described in "Numerical Recipes In C" by Press et al, $2^{nd}$ edition, New York, N.Y., Cambridge University Press, 1992. Those of skill in the art will however appreciate that other registration algorithms can be used to align the brain component of the head atlas to the three-dimensional brain image. During this alignment procedure, a set of 3D spatial transformation parameters representing the three-dimensional transformations, including but not limited to rotation, shifting and scaling, that are necessary to register the brain component of the head atlas with the three-dimensional brain image, is calculated and is stored in the computer memory as a matrix.

Once the set of 3D transformation parameters is calculated and stored, the 3D spatial transformation parameters in the set are applied to the anatomical component of the head atlas to register it with the three-dimensional brain image (block 58). With the anatomical component of the head atlas aligned with the three-dimensional brain image, the atlas can be used as a density distribution guide to the application of scatter and attenuation correction to the three-dimensional brain image.

With an accurate density distribution guide established, scatter correction is applied to the three-dimensional brain image followed by attenuation correction in a known manner (block 60). Once scatter and attenuation correction has been applied to the three-dimensional brain image, the brain image is reconstructed into a three-dimensional array in computer memory to complete the image correction process (block 62). The corrected three-dimensional brain image can then be analyzed (block 64). Appendix A includes pseudocode representing the above-identified process.

FIGS. 3a to 3f show a comparison of two-dimensional brain images of a head phantom with anatomy derived from transmission images (appurtenant anatomy) and anatomy derived from a head atlas (inferred anatomy) applied.

The present method and apparatus was tested using an anthropomorphic head phantom modeling soft tissue, hard tissue and air cavities within a skull and including a two-compartment brain reservoir. The two compartments of the reservoir were separately filled with two water solutions of Tc-99m, having a specific activity ratio of 4:1. Fan-beam SPECT was acquired followed by a Tc-99m transmission scan sixty hours later. The reconstructed transmission image is referred to as appurtenant anatomy.

Five scatter and attenuation correction schemes were evaluated based on non-uniform appurtenant anatomy, uniform appurtenant anatomy, non-uniform inferred anatomy, uniform inferred anatomy, and uniform brain contour. For uniform scatter and attenuation correction, the inferred and appurtenant anatomies were segmented and assigned uniform attenuation coefficients of soft tissue (0.15 $cm^{-1}$ for Tc-99m). A SPECT reconstruction of the head phantom was similarly processed to facilitate scatter and attenuation correction guided by brain contour. Scatter correction was based on a non-stationary deconvolution scatter subtraction as described in the paper authored by Stodilka et al entitled "The Relative Contributions of Scatter and Attenuation Correction Toward Brain SPECT Quantification", Phys Med Biol, 1998. Attenuation correction/reconstruction was subsequently performed by ordered-subsets expectation-maximization as set out in the paper authored by Hudson HM et al entitled "Accelerated Image Reconstruction using Ordered Subsets of Projection Data", *IEEE Trans Med Imaging* 13 601–609, 1994. Although particular examples of scatter correction, attenuation correction and reconstruction algorithms are described, those of skill in the art will appreciate that other scatter correction, attenuation correction and reconstruction methods can be used.

Figure 4:
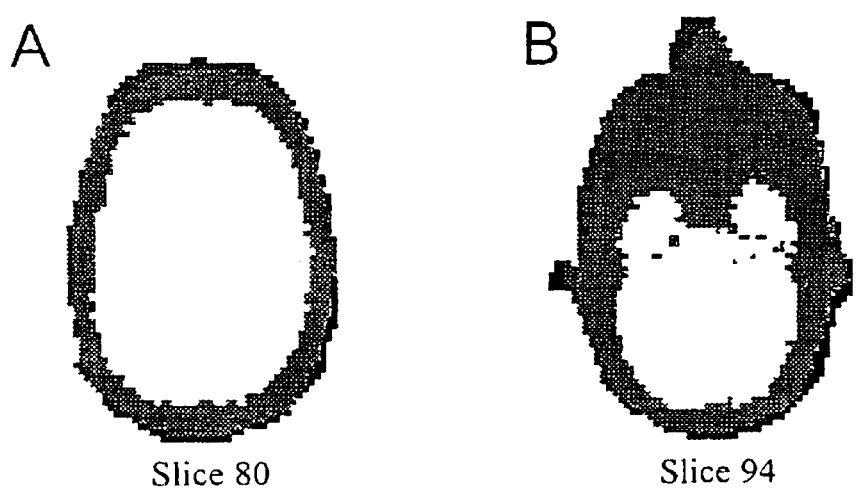
FIGS. 4 and 5 show two-dimensional brain images and a graph comparing uniform appurtenant anatomy, uniform inferred anatomy and brain contour.
Figure 5:
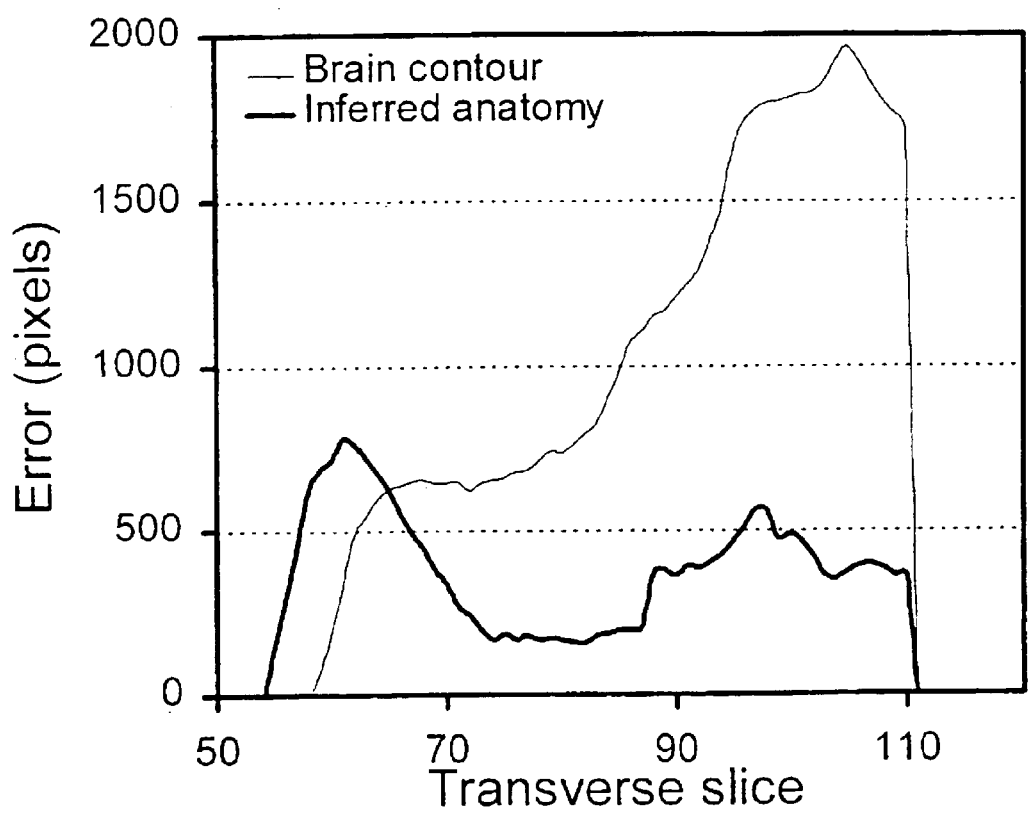
Figure 6:
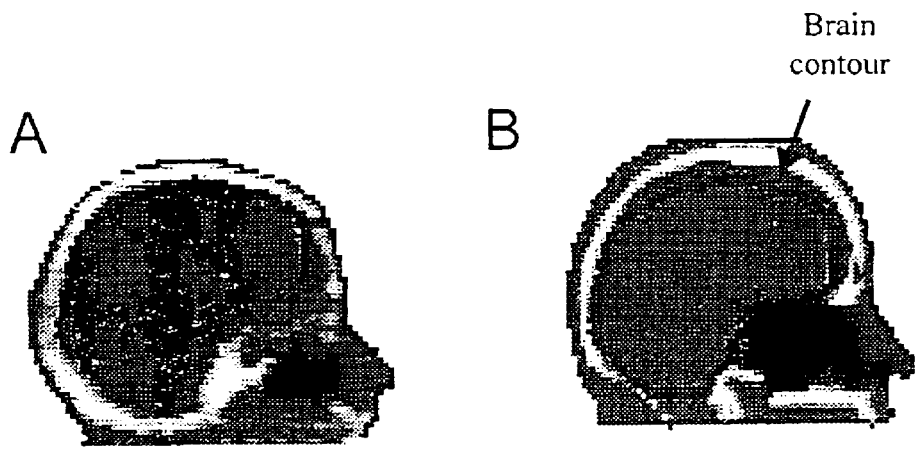
FIG. 6 shows two-dimensional brain images with non-uniform appurtenant and non-uniform inferred anatomy applied thereto.

Uniform scatter and attenuation correction should be guided by the contour of the attenuating medium if an acceptable level of accuracy for objective diagnosis is to be expected. FIGS. 4 and 5 show that uniform appurtenant anatomy is better approximated by uniform inferred anatomy than by brain contour. As can be seen in FIG. 6, non-uniform appurtenant anatomy and non-uniform inferred anatomy are similar.

Head phantom SPECT reconstructions were quantitatively evaluated by four metrics, namely bias, uniformity, contrast-recovery, and relative quantification (see FIGS. 7 and 8). As will be appreciated, scatter and attenuation correction guided by inferred anatomy provides quantitative accuracy that is distinctively superior to scatter and attenuation correction guided by brain contour.

Application of scatter and attenuation correction to emission tomography images of anatomy other than the head can also be performed. For example, inferred anatomy can also be used to apply scatter and attenuation correction to cardiac images. During construction of the cardiac atlas, an anatomical component of the cardiac atlas representing the anatomical features of the thorax is created and includes:

soft-tissues such as the heart, liver, muscle, and fat;
very low-density soft-tissues such as the lungs; and
high-density tissues such as bone and cartilage in the ribs and spine.

A functional component of the cardiac atlas is also created and simulates a SPECT or PET cardiac image. Appropriate data to construct the cardiac atlas can be obtained in a variety of ways including, but not limited to, imaging a phantom or human subject by X-ray CT, MRI, or gamma-camera transmission computed tomography; or computer simulation. Also, the cardiac atlas can be constructed by amalgamating a plurality of patient scans.

The procedure of using inferred cardiac anatomy to apply scatter and attenuation correction to cardiac images remains the same as with brain imaging described above. First, a preliminary reconstruction of the patient's cardiac SPECT data is performed. The functional component of the cardiac atlas is then registered to the preliminary reconstruction. The registration includes a spatial transformation that may include shifting, rotation, scaling, and/or non-linear operations such as warping. The registration procedure calculates a matrix representing the spatial transformation that maps atlas space into patient-specific space. Once the matrix has been calculated, the matrix is applied to the anatomical component of the cardiac atlas, thus inferring anatomy in the chest.

Although the above methods describe the use of a single generic atlas of the anatomy under observation, those of skill in the art will appreciate that custom atlases can be developed and stored in the database. For example, disease specific atlases such as an Alzheimer's disease atlas or a stroke atlas can be developed and used when correcting emission tomography images of patients suffering from those diseases. The disease specific atlases may be tracer or lesion specific to allow for local concavities in radiopharmaceutical uptake. Patients with severe Alzheimer's or Pick's disease do not have normal cerebral blood flow. Areas with flow deficits can limit the accuracy of the registration of the emission tomography images with the functional component of the head atlas if the head atlas assumes normal blood flow and hence uniform radiopharmaceutical uptake. Atlases can also be developed to take into account physical traits such as for example, an exceptionally large nasal sinus. During scatter and attenuation correction, the operator can select the appropriate atlas to use. Alternatively, the atlas can be selected automatically by computer software. In this case, the software, performs a preliminary reconstruction using each custom atlas and registers the atlas to the preliminary reconstruction to measure the accuracy of the registration. The atlas with the highest registration accuracy is then selected. If desired, the software can use fuzzy logic, theoretical calculations or other criteria to combine two or more atlases to yield a single resultant atlas, which provides a better degree of registration.

EXAMPLE

Example 1

Inferred Anatomy and Brain Imaging

The following example is described for the purposes of illustration and is not intended to limit the scope of the present invention.

Inferring Anatomy From a Head Atlas

A head atlas was prepared as follows. A Zubal three-dimensional digitized MRI head phantom [Zubal et al 1994] was segmented to produce two data sets, namely a SPECT atlas simulating a SPECT scan of the phantom, and an anatomical atlas simulating a transmission scan of the phantom. The SPECT atlas consisted of voxels containing gray-matter and white-matter, to which $^{99m}$Tc-HMPAO relative uptakes of 4 and 1 had been assigned respectively. The anatomical atlas consisted of voxels containing hard-tissue, soft-tissue and nasal sinus, to which the correspondent 140 keV narrow-beam attenuation coefficients of 0.25, 0.15, and 0.075 cm$^{-1}$ were assigned.

A patient SPECT scan was then reconstructed without scatter and attenuation correction. Facial activity was removed to yield a data set referred to as the preliminary patient reconstruction. The SPECT atlas was then registered to the preliminary patient reconstruction and the spatial transformation was recorded. This transformation was then applied to the anatomical atlas, thus inferring the location of the patient's soft-tissue, hard-tissue and air cavities (see FIG. 9).

A general-purpose radiological analysis program (Hermes, Nuclear Diagnostics, Stockholm, Sweden) was used to perform the unimodality registration. The large variation in head orientation necessitated that a manual registration be first performed. This was followed by an automated refinement. The cost function of the automated registration was defined as the sum of absolute count differences [Hoh et al 1993]. A global minimum was sought by a simplex search [Nelder and Mead 1965] within a parameter space consisting of rotating, shifting, and linear scaling in x, y, and z directions [Holman et al 1991, Slomka et al 1995].

Sequential Transmission and Emission Imaging

Ten dementia patients (5 females and 5 males, with a mean age of 64.3 years) were analyzed. For each patient, a transmission scan was first acquired. Patients became very relaxed during the quiet transmission scan, and were then injected with 740 MBq of $^{99m}$Tc-HMPAO. The SPECT procedure was started approximately 5 minutes post-injection. The SPECT system, which has transmission capabilities, is described in detail [Kemp et al 1995]. It consists of a General Electric 400AC/T gamma camera (General Electric, Milwaukee, Wis.) with a 409.6 mm diameter circular field-of-view. Projections were acquired through a fan-beam collimator (Nuclear Fields, Des Plaines, Ill.) having a 600 mm focal length and 1.5 mm flat-to-flat hexagonal hole width. The transmission component includes a frame mounted onto the camera's collimator that holds a tantalum-collimated $^{99m}$Tc line source along the focal line of the fan-beam collimator. Collimation of both the line source and camera minimizes scatter. As a result, the transmission system effectively measures narrow-beam attenuation coefficients [Tsui et al 1989, Kemp et al 1995]. SPECT and transmission scans were acquired with a 20% energy window, centered on the $^{99m}$Tc photopeak of 140 keV. The scans consisted of 128 projections, equally spaced over 360°. Each circular projection was acquired into a 128×128 pixel square matrix (1 pixel=3.2 mm). Both transmission and SPECT scans were 10 seconds per projection and count rates were approximately 70 and 1.5 kcounts per second, respectively. All scans were corrected for uniformity using 100 million count flood images, and transmission scans were normalized to 50 million count blank images. Radii of rotation varied among the patients; the smallest being 170 mm and the largest being 205 mm. Prior to reconstruction, all scans were rebinned to object-plane parallel-hole geometry via two-dimensional cubic interpolation.

Scatter and Attenuation Correction and Reconstruction

The SPECT data were reconstructed using a maximum-likelihood estimator with an unregularized 32-level ordered subset [Hudson and Larkin 1994] implementation of the expectation maximization algorithm [Shepp and Vardi 1982, Lange and Carson 1984] (OSEM). The four projections that were used per sub-iteration were equally spaced about 360°. Attenuation was modelled in the matched projector/backprojector pair, and a scatter estimate [Stodilka et al 1998b] was added as an a priori background following forward projection [Lange and Carson 1984, Bowsher et at 1996, Kadrmas et al 1998]. Both scatter and attenuation modelling incorporated the narrow-beam attenuation coefficients from transmission imaging or inferred anatomy. Detector response was not included. Four iterations of OSEM were used, following initialization with a uniform [Nunez and Llacer 1990] support prior derived from transmission reconstruction or inferred anatomy. Reconstructions were then post-filtered [Nunez and Llacer 1990] using a three-dimensional Butterworth filter with an order of 8 and cutoff at 0.42 $cm^{-1}$. The transmission data were also reconstructed by the emission OSEM algorithm, following blank scan normalization and log-transformation.

Line source collimation, coupled with limitations in detector count rate capability and patient compliance resulted in less than ideal transmission statistics. To reduce the effects of transmission imaging noise propagation into the SPECT reconstruction [Xu et al 1991, Tung and Gullberg 1994], the transmission reconstructions were segmented as follows. Soft-tissue in the reconstructed transmission volumes was forced to have uniform density. First, a large region of interest (ROI) was drawn around soft-tissue regions, and mean and variance estimates were calculated. Then, all voxels having count densities within ±2 standard deviations of this mean were assigned to 0.15 $cm^{-1}$. Thus, the transmission reconstructions were characterized by noiseless soft-tissue, yet featured hard-tissue and air cavities.

Template-Based Quantification

Previous work has identified that a major confound to reproducible quantification, originates from manual and threshold-dependent placement of anatomical ROIs onto SPECT scans [Msaki et al 1998]. To reduce this subjective source of error, a normal template [Msaki et al 1998] onto which twelve bilateral volumetric ROIs are demarcated [Karbe et al 1994] was used. The ability to store the template and its ROIs ensures reproducibility of the analysis. This quantification procedure also introduces standardization to the analysis, which facilitates the exchange of data among different institutions [Evans et al 1988]. All reconstructed scans were registered to the normal template, herein referred to as "spatial normalization". Prior to spatial normalization, voxels previously identified as facial activity were set to zero. Following superposition of the template ROIs onto each scan, the cortical rCBF for each ROI was normalized to cerebellar rCBF [Karbe et al 1994] and corrected for blood flow-dependent tracer reflux [Lassen et al 1988]. Analysis of the absolute concentration of radiopharmaceutical was not performed since currently, absolute rCBF quantification is seldom used in SPECT [Bakker and Pauwels 1997].

Quantitative Error Analysis

Figure 10:
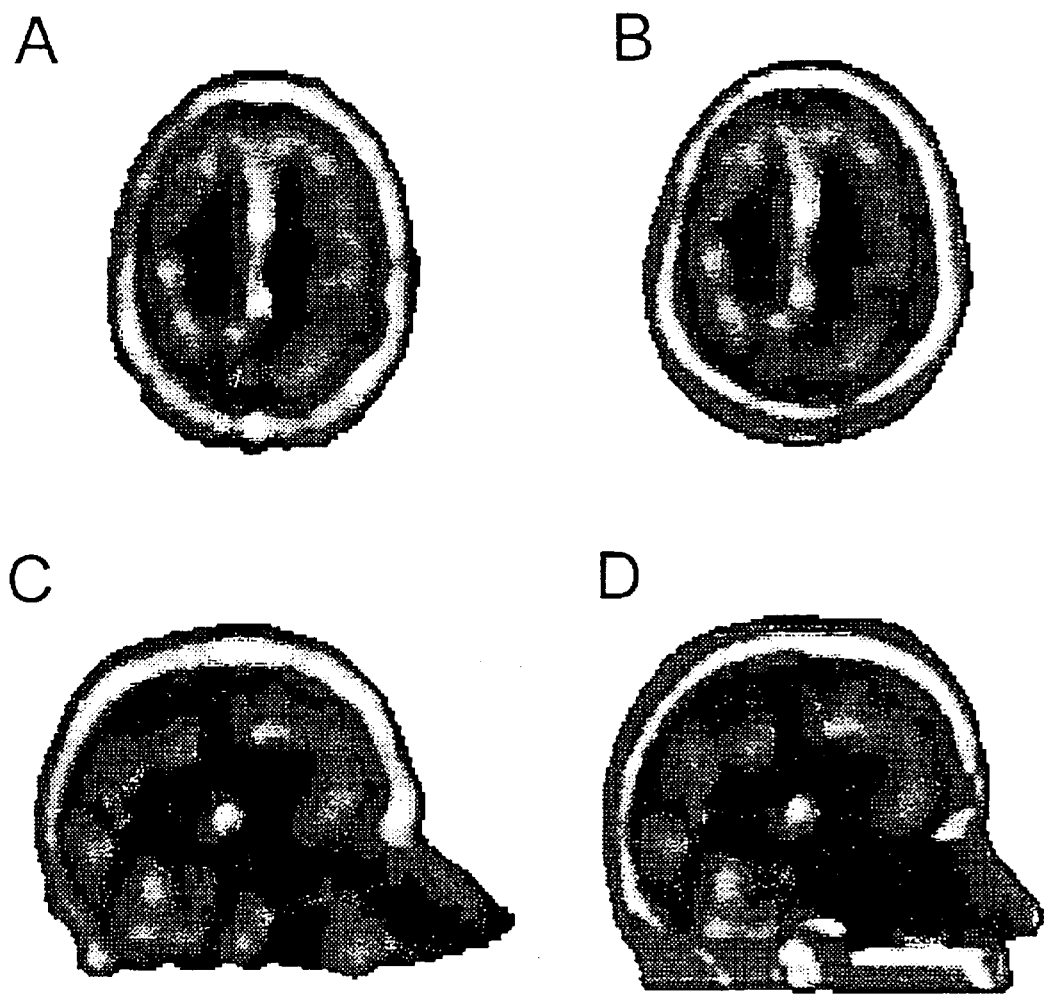
FIG. 10 shows SPECT brain images superimposed onto transmission reconstruction and inferred anatomy.
Figure 11:
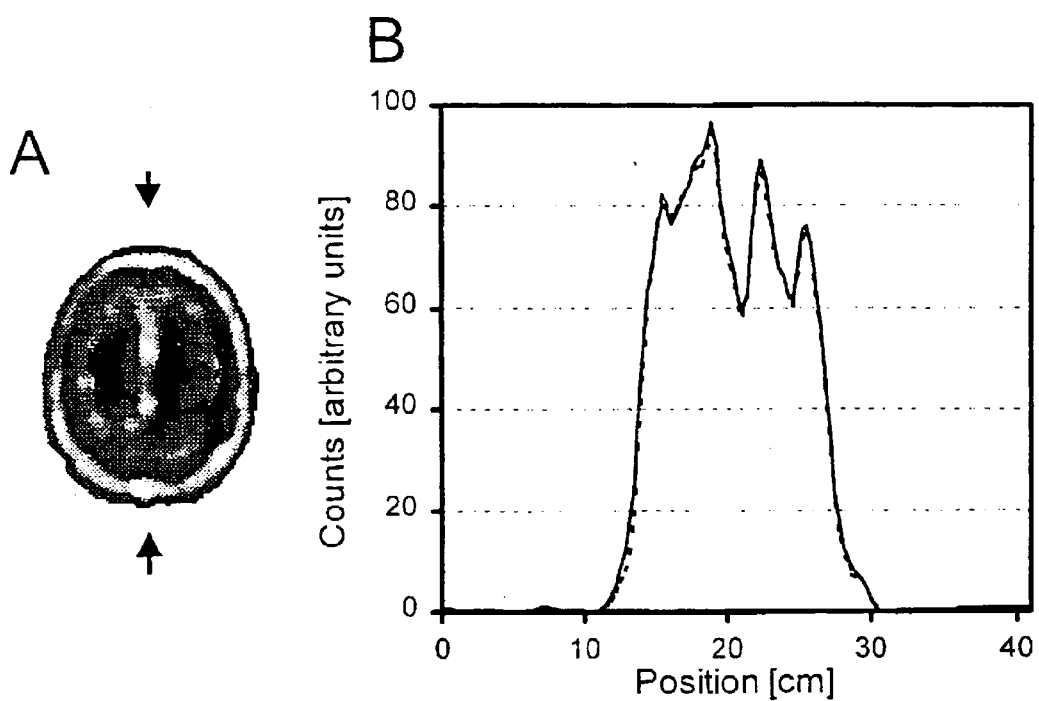
FIG. 11 shows profiles taken through reconstructions of a SPECT brain image.

A sample of inferred anatomy and transmission reconstruction is illustrated in FIG. 10. In FIG. 11, profiles through the SPECT reconstructions guided by transmission scans and inferred anatomy are presented. The profiles have not been normalized to cerebellar count density.

The means and standard errors of regional cerebral blood flow from SPECT scans guided by inferred anatomy and transmission scans were compared ROI-by-ROI (see FIG. 12). Statistical analysis was also performed ROI-by-ROI using repeated analysis of variance to determine where there were significant differences between the inferred anatomy versus transmission-guided reconstruction methods. Pooled-ROI and ROI-dependent correlation coefficients were calculated between inferred anatomy reconstruction and transmission-guided SPECT reconstructions. FIG. 13 shows the correlation between the two reconstruction and quantification methods by pooling all ROIs and patients together. The p value for significance was set to 0.05 for all tests.

Inferred Anatomy Error Propagation Analysis

Four sources of error were identified that contribute to discrepancies in ROI quantification:

(1) inferred anatomy-guided scatter correction;
(2) inferred anatomy-guided attenuation correction;
(3) inferred anatomy-guided spatial normalization, which is equivalent to ROI misplacement; and
(4) patient motion between transmission and SPECT scans.

The first two are inherent limitations to the principle of inferred anatomy, whereas the last two represent artifactual exaggerations of errors in the context of this example. The first three sources of error, namely scatter, attenuation, and ROI misplacement were measured.

The propagation of ROI quantification to differences between inferred anatomy scatter correction and transmission-guided scatter correction were analyzed by performing:

(1) inferred anatomy-derived scatter correction;
(2) transmission-derived attenuation correction; and
(3) applying the spatial normalization calculated to be optimal for registering the transmission-derived SPECT reconstruction to the quantification template.

A similar analysis for evaluating the effects of inferred anatomy-derived attenuation correction was carried out by performing:

(1) transmission -derived scatter correction;
(2) inferred-anatomy derived attenuation correction; and
(3) applying the spatial normalization calculated to be optimal for registering the transmission-derived SPECT reconstruction to the quantification template.

The effects of ROI misplacement were quantified by performing transmission-derived scatter and attenuation correction, and then applying the spatial transformation calculated to be optimal for registering the inferred anatomy-derived SPECT reconstruction to the quantification template. Thus, the full propagation analysis resulted in three reconstructions, each of which was quantitatively compared (via the above-described template-based quantification procedure) with the "gold-standard" transmission-derived SPECT reconstruction and spatial normalization. This procedure was performed for the ten patients, and the results averaged. However, once the errors due to scatter, attenuation and ROI misplacement were separately quantified, their totals were found to be less than the errors caused by the full inferred anatomy protocol. This additional source of error is termed "unaccountable" in Table 2, and is believed to be caused by patient motion.

Qualitative Analysis

A sample comparison of inferred anatomy and transmission reconstruction is shown in FIG. 10 for mid-sagittal and cortical-axial slices. Good reproduction of soft-tissue and hard-tissue at the cortical level is noted. Some discrepancy is seen near the vertex; however, this region is seldom included in quantitative analysis. Discrepancies near the nasal sinus are most marked. Fortunately, these structures mostly involve low-density areas such as air, and to a much lesser degree, soft-tissues and cartilage, which do not scatter and attenuate photons as much as higher density structures.

Mid-brain profiles, shown in FIG. 11, compare a SPECT reconstruction guided by transmission imaging with the same SPECT reconstruction guided by inferred anatomy. The profile was taken along the longest axis of the head, which is most sensitive to mis-registered transmission maps following scatter and attenuation correction [Huang et al 1979].

Quantitative Error Analysis

Table 1 below shows the results of the repeated analysis of variance and correlation analysis comparing transmission reconstruction and quantitative and inferred anatomy-guided reconstruction and quantification. Left frontal and central sulcus ROIs showed the highest probability of a true difference, reaching statistical significance with p=0.001 and 0.002, respectively. These ROIs also had the highest correlation coefficients relating transmission reconstruction and quantification and inferred anatomy-guided SPECT reconstruction and quantification. This increased correlation may be an artifact of the increased differences in the ROI means. Interestingly, the left frontal and central sulcus ROIs were also found to have marked rCBF deficits, suggesting that inferred anatomy may have difficulties near regions with substantially reduced radiopharmaceutical uptake.

FIG. 12 shows the means and standard errors for transmission reconstruction and inferred anatomy in each of the 12 ROIs, averaged across the entire population. The mean absolute difference for all ROIs across the whole population was 7.5%. Correlation for all ROIs and all patients was found to be high: r'=0.92 as illustrated in FIG. 13.

TABLE 1

| Region | ANOVA Significance | Paired sample correlation | Paired sample Significance |
|---|---|---|---|
| Left frontal | 0.001 | 0.965 | <0.001 |
| Right frontal | 0.088 | 0.953 | <0.001 |
| Left central sulcus | 0.002 | 0.957 | <0.001 |
| Right central sulcus | 0.234 | 0.937 | <0.001 |
| Left parietal | 0.092 | 0.772 | 0.009 |
| Right parietal | 0.473 | 0.862 | 0.001 |
| Left temporal | 0.957 | 0.939 | <0.001 |
| Right temporal | 0.397 | 0.835 | 0.003 |
| Left occipital | 0.271 | 0.835 | 0.003 |
| Right occipital | 0.073 | 0.858 | 0.001 |
| Left cerebellar | 0.545 | 0.938 | <0.001 |
| Right cerebellar | 0.603 | 0.925 | <0.001 |

Error Propagation Analysis

The results from the propagation analysis are presented in Table 2 below. These results are presented as errors relative to the "gold-standard" transmission reconstruction-guided reconstruction and spatial normalization. Three sources of error due to inferring anatomy were analyzed namely, errors in scatter distribution estimates, errors due to misguided attenuation compensation, and errors due to region-of-interest misplacement. The error components, averaged across ten patients, are shown for each of the twelve bilateral regions-of-interest. The table summarizes the percentage that each of these error sources contributed to the total quantitative differences between SPECT reconstructions guided by transmission scans or inferred anatomy. The fourth numerical column indicates the percentage of total differences that could not be accounted for by inferring anatomy.

On average, it was found that errors in scatter distribution estimates results in approximately 10.0% of the total quantitative error; attenuation correction: 36.6%, and ROI misplacement: 27.0%. The relative contributions of inferred anatomy-derived scatter and attenuation correction to the total error seem credible. Compensating for attenuation is of considerably greater consequence than removing scattered photons [Rosenthal et al 1995]. Approximately 26.5% of the total discrepancy between inferred anatomy and transmission imaging could not be accounted for in the error propagation analysis of scatter, attenuation, and ROI misplacement but is believed to be as a result of patient motion during data acquisition.

TABLE 2

| Region | Scatter correction % | Attenuation correction % | Region misplacement % | Unaccountable error % |
|---|---|---|---|---|
| Left frontal | 6.1 | 44.5 | 28.6 | 20.8 |
| Right frontal | 12.0 | 49.9 | 29.4 | 8.7 |
| Left central sulcus | 5.7 | 40.4 | 17.9 | 36.0 |
| Right central sulcus | 6.3 | 34.3 | 16.0 | 43.4 |
| Left parietal | 7.9 | 25.7 | 30.3 | 36.1 |
| Right parietal | 10.0 | 34.1 | 25.9 | 30.0 |
| Left temporal | 10.0 | 38.3 | 20.0 | 31.8 |
| Right temporal | 13.8 | 27.0 | 30.7 | 28.5 |
| Left occipital | 13.2 | 23.2 | 27.6 | 36.0 |
| Right occipital | 8.3 | 22.5 | 29.0 | 40.2 |
| Left cerebellar | 13.5 | 48.7 | 31.9 | 5.8 |
| Right cerebellar | 12.5 | 50.2 | 36.4 | 0.8 |
| Average | 10.0 | 36.6 | 27.0 | 26.5 |

Qualitative and Quantitative Comparisons

Comparing inferred anatomy with transmission reconstructions indicated good reproduction of soft-tissue and hard-tissue in cortical areas for all ten patients. However, in many scans, a discrepancy was indicated near the sinus cavity, as shown in FIG. 10. Despite this, inferred anatomy is more robust and accurate in providing estimates of underlying tissue distribution than fitting ellipses to photopeak emission data. The technique of fitting ellipses depends on adequate facial activity since the contours of the brain and head differ so considerably at the level of the cerebellum. Facial activity should not form the basis for estimating underlying tissue distributions since uptake varies with radiopharmaceutical and time between injection and scanning [Leveille et al 1992, Van Dyck et al 1996], making it an unreliable dependency. Parenthetically, the qualitative similarities demonstrated between inferred anatomy and transmission reconstruction indicate confidence in accurately guiding scatter and attenuation correction. However, it is important to note that similar shape is a sufficient, but not necessary, prerequisite for accurate scatter and attenuation correction [Welch et al 1997, Natterer 1993].

Slight truncation effects are noticed on the transmission images for three of the ten scans. Truncation occurred for kyphotic patients with broad shoulders or with short necks. This limitation was generally restricted to transaxial slices below the level of the cerebellum or very near its base, where the gamma camera's circular field-of-view proved to be inconvenient. The truncation only involved nasal cartilage, and is therefore not expected to significantly impact results, as is demonstrated in the quantitative accuracy exhibited at the cerebellar level (see FIG. 12).

Inferred anatomy had difficulties in regions with marked rCBF deficit, such as the left frontal lobe. Although frontal lobes generally exhibit high variability in HMPAO uptake

[Deutsch et al 1997], only the left frontal lobe had statistically significant error. This suggests that regional quantitative errors incurred by inferred anatomy are associated with rCBF deficits. However, previous work demonstrates that they may also be sensitive to spatial region. Achieving good quantitative accuracy in extended sources is often difficult and this is particularly true with peripheral ROIs, where reconstructed activity is most sensitive to misregistration of the attenuating medium [Huang et al 1979]. For example, in the brain a mismatch between emission and transmission data no greater than 5 mm can produce a 10% error in a 10 mm thick peripheral cortical ROI [Andersson et al 1995b, Huang et al 1979]. In general, extended sources, such as the brain, are affected by misregistration more than compact sources, such as the heart [Andersson et al 1995b, McCord et al 1992, Ter-Pogossian 1992, Matsunari et al 1998]. Since the brain is elliptical, it is expected that regions along the periphery of the long axis of the head will be more sensitive to attenuation map misregistration than those along the short axis.

Although a preferred embodiment of the present invention has been described, those of skill in the art will appreciate that variations and modifications may be made to the present invention without departing from the spirit and scope thereof as defined by the appended claims.

APPENDIX A

```
emis_proj =              //initialize 3D array. Projections are 2D,
                         but we have
                         //many projections.
emis_proj_sc =           //init 3D array. Store projections here
                         after scatter
                         //correction.
emis_proj_sc_ac =        //init 3D array. Store projections here
                         after scatter and
                         //attenuation correction.
emis_reco_sc_ac =        //init 3D array. The reconstructed
                         3D brain scan.
tx_proj =                //init 30 array. Transmission projections
                         of anatomy.
anatomy =                //init 3D array. The 3D distribution
                         of anatomy goes
                         //here.
emis_proj = do_patient_emission_scan;
                // first step is to acquire the patient emission scan.
                // The acquire data is in the form of projections of the
                // radiopharmaceutical distribution.
                // These projections require scatter and attenuation
                // correction.
                // In order to perform these corrections, an estimate of
                // anatomy must be obtained. Current, two methods of
                // obtaining an anatomy estimate are possible:
if (infer==1)
   anatomy = infer_anatomy(emis_proj);   // This is our method. See the
                                         // function, below.
                                         This is what
                                         // we are patenting.
elseif (infer==0)
{
                         // Alternatively, we acquire transmission
                         projections of
                         // the patient.
                         // This is very similar to x-ray CT.
   tx_proj = do_patient_transmission_scan;
   anatomy = reconstruct(tx_proj);    // These projections are
                         // reconstructed into a 3D
                         // distribution of anatomy. Note
                         // that this reconstruction is
                         // almost identical to the
                         // emission reconstruction;
                         // however, transmission
                         // reconstructions do not
                         // require scatter or attenuation
                         // correction.
```

APPENDIX A-continued

```
}
                // After we have our emission projections and an anatomy
                // estimate, we sequentially apply scatter correction and
                // attenuation correction to the emission data.
emis_proj_sc = scatter_correction(emis_proj,anatomy);
                // Perform the scatter correction on the
                // emission data.
                // The scatter correction requires knowing the
                // anatomy.
emis_proj_sc_ac = attenuation_correction(emis_proj_sc,anatomy);
                // Perform the attenuation correction on the
                // emission data that has been scatter corrected.
                // The attenuation correction requires knowing the
                // anatomy.
emis_reco_sc_ac = reconstruct(emis_proj _sc_ac);
                // After correcting the emission data for scatter
                // and attenuation, perform the emission
                // reconstruction.
Stop
function aligned_head_atlas = infer_anatomy(emis_proj);
{
   emis_reco =      // init 3D array. This will hold a
                    preliminary emission
                    // reconstruction that has NOT been
                    corrected for scatter
                    // or attenuation.
   head_atlas =     // init 3D array. This will hold the full head
                    // atlas (brain, skull, soft tissue). The head
                    // atlas is in its original orientation.
   head_atlas_brain =  // init 3D array. This will hold the brain
                       // component of the head atlas. This brain
                       // component will be in its original
                       // orientation.
   alignment_par =  // a set of parameters that represent the 3D
                    // transformations (including, but not limited to:
                    // rotation, shifting, scaling) necessary to align
                    // head_atlas_brain to emis_reco. These
                    // transformations will be applied to
                    head_atlas.
   aligned_head_atlas =  // init 3D array. The alignment parameters
                         // are applied to head_atlas. This variable
                         // is the function's output.
   emis_reco = reconstruct(emis_proj)   // Perform a preliminary
                                        // reconstruction of
                                        the emission
                                        // data.
   head_atlas = load_3D_data(atlas filename);   // Load the head
                                                // atlas.
   head_atlas_brain = extract(head_atlas,brain);   // Identify and
                                                   // extract the brain
                                                   // from the head
                                                   // atlas.
   alignment_par = find_optimal_alignment(emis_reco,head_atlas_brain);
                       // Calculate the 3D transformation parameters
                       // to align head_atlas_brain to emis_reco.
                       // This procedure calculates the optimal set
                       // of transformation parameters. In medical
                       // science, this alignment is known as
                       // "registration".
   aligned_head_atlas = apply_alignment(head_atlas,alignment_par) ;
                       // Apply the alignment to head_atlas.
                       // aligned_head_atlas
                       // represents an anatomy estimate that is
                       // used for guiding the scatter and
                       // attenuation corrections. (Note that the
                       // variable aligned_head_atlas is passed back
                       // as anatomy to the main program.) Also note
                       // that, although the set of transformation
                       // parameters that was calculated represents
                       // the optimal set for aligning
                       // head_atlas_brain to emis_reco, these same
                       // parameters are now applied to head_atlas.
}
```

References

1. Acton P D and Friston K J (1998) Statistical parametric mapping in functional neuroimaging: beyond PET and fMRI activation studies *Eur J Nucl Med* 25 663–667

2. Andersson J L R, Sundin A and Valind S (1995a) A Method for Coregistration of PET and MR Brain Images *J Nucl Med* 36 1307–1315
3. Andersson J L R, Vagnhammer B E and Schneider H (1995b) Accurate Attenuation Correction Despite Movement during PET Imaging *J Nucl Med* 36 670–678
4. Andersson J L R (1995c) A Rapid and Accurate Method to Realign PET Scans Utilizing Image Edge Information *J Nucl Med* 36 657–669
5. Ardekani B, Braun M and Hutton B (1993) Improved quantification with the use of anatomical information in PET image reconstruction. In: Uemura K, Lassen N A, Jones T, Kanno I, eds. *Quantification of Brain Function, tracer kinetics and image analysis in brain PET.* International congress series no 1030 351–359
6. Ashare A B and Chakraborty D P (1994) Artificial Neural Networks: Better Than the Real Thing? *J Nucl Med* 35 2048–2049
7. Bacharach S L and Buvat I (1995) Attenuation correction in cardiac positron emission tomography and single-photon emission computed tomography *J Nucl Cardiol* 2 246–255
8. Bailey D L (1998) Transmission scanning in emission tomography *Eur J Nucl Med* 25 774–787
9. Bakker D and Pauwels E K J (1997) Stroke: the role of functional imaging *Eur J Nucl Med* 24 2–5
10. Bergstrom M, Litton J, Eriksson L, Bohm C and Blomkvist G (1982) Determination of Object Contour from Projections for Attenuation Correction in Cranial Positron Emission Tomography *J Comp Assist Tomo* 6 365–372
11. Bergstrom M, Eriksson L, Bohm C, Blomqvist G and Litton J (1983) Correction for Scatter Radiation in a Ring Detector Positron Camera by Integral Transformation of the Projection *J Comput Assist Tomo* 7 42–50
12. Bailey D L, Hutton B F and Walker P J (1987) Improved SPECT using simultaneous emission and transmission tomography. *J Nucl Med* 28 844–851
13. Bowsher J E, Johnson V A, Turkington T G, Jaszczak R J, Floyd C E and Coleman R E (1996) Bayesian Reconstruction and use of Anatomical A Priori Information for Emission Tomography *IEEE Trans Med Imag* 15 673–686
14. Budinger T F and Gullberg G T (1977) Transverse section reconstruction of gamma-ray emitting radionuclides in patients. In: Ter-Pogossian M M, Phelps M E, Brownell G L, eds *Reconstruction tomography in diagnostic radiology and nuclear medicine* Baltimore: University Park Press 315–342
15. Chabriat H. Lavasseur M, Vidailhet M, Loc'h C, Maziere B, Bourguignon M H, Bonnet A M, Zilbovicius M, Raynaud C, Agid Y, Syrota A and Samson Y (1992) In-Vivo SPECT imaging of D2 Receptor with Iodine-Iodolisuride: Results in Supranuclear Palsy *J Nucl Med* 33 1481–1485
16. Chan K H, Johnson K A, Becker J A, Satlin A, Mendelson J, Garada B, and Holman B L (1994) A Neural Network Classifier for Cerebral Perfusion Imaging *J Nucl Med* 35 771–774
17. Claus J J, van Harskamp F. Breteler M M B, Krenning E P, van der Cammen T J M, Hofman A and Hasan D (1994) Assessment of cerebral perfusion with single-photon emission tomography in normal subjects and in patients with Alzheimer's disease: effects of region of interest selection. *Eur J Nucl Med* 21 1044–1051
18. DeFizueiredo R J P, Shankle W R, Maccato A, Dick M B, Muidkur P, Mena I and Cotman C W (1995) Neural-network-based classification of cognitively normal, demented, Alzheimer disease and vascular dementia from single photon emission with computed tomography image data from brain *Proc Natl Acad Sci USA* 92 5530–5534
19. Deutsch G, Mountz J M, Katholi C R, Liu H G and Harrell L E (1997) Regional Stability of Cerebral Blood Flow Measured by Repeated Technetium-99m-HMPAO SPECT: Implications for the Study of State-Dependent Change *J Nucl Med* 38 6–13
20. Eberl S, Kanno I, Fulton R R, Ryan A, Hutton B F and Fulham M J (1996) Automated Interstudy Image Registration Technique for SPECT and PET *J Nucl Med* 37 137–145
21. Evans A C, Beil C, Marrett S, Thompson C J and Hakim A (1988) Anatomical-Functional Correlation Using an Adjustable MRI-Based Region of Interest Atlas with Positron Emission Tomography *J Cereb Blood Flow Metab* 8 513–530
22. Floyd C E, Jaszczak R J, Greer K L and Coleman R E (1985) Deconvolution of Compton Scatter in SPECT *J Nucl Med* 26 406–408
23. Frey E C, Tsui B M W and Perry J R (1992) Simultaneous acquisition of emission and transmission data for improved Tl-201 cardiac SPECT imaging using a Tc-99m transmission source. *J Nucl Med* 33 2238–2245
24. Hoh C K, Dahlbom M, Harris G, Choi Y, Hawkins R A, Phelps M E and Maddahi J (1993) Automated iterative three-dimensional registration of positron emission tomography images *J Nucl Med* 34 2009–2018
25. Hollinger E F, Loncaric S, Yu D-C, Ali A and Chang W (1998) Using Fast Sequential Asymmetric Fanbeam Transmission CT for Attenuation Correction of Cardiac SPECT Imaging *J Nucl Med* 39 1335–1344
26. Holman B L, Zimmerman R E, Johnson K A, Carvalho P A, Schwartz R B, Loeffler J S, Alexander E, Pelizzari C A and Chen G T Y (1991) Computer-Assisted Superimposition of Magnetic Resonance and High-Resolution Technetium-99m-HMPAO and Thallium-201 SPECT Images of the Brain *J Nucl Med* 32 1478–1484
27. Hosoba M, Wani H, Toyama H, Murata H and Tanaka E (1986) Automated Body Contour Detection in SPECT: Effects on Quantitative Studies *J Nucl Med* 27 1184–1191
28. Huang S-C, Hoffman E J, Phelps M E and Kuhl D E (1979) Quaititation in Positron Emission Computed Tomography: 2. Effects of Inaccurate Attenuation Correction *J Comp Assist Tomo* 3 804–814
29. Huang S-C, Carson R E, Phelps M E, Hoffman E J, Schelbert H R, and Kuhl D E (1981) A Boundary Method for Attenuation Correction in Positron Computed Tomography *J Nucl Med* 22 627–637
30. Hudson H M and Larkin R S (1994) Accelerated Image Reconstruction using Ordered Subsets of Projection Data *IEEE Trans Med Imag* 13 601–609
31. Iida H, Narita Y, Kado H, Kashikura A, Sugawara S, Shoji Y, Kinoshita T, Ogawa T and Eberl S (1998) Effects of Scatter and Attenuation Correction on Quantitative Assessment of Regional Cerebral Blood Flow with SPECT *J Nucl Med* 39 181–189
32. Jaszczak R J, Chang L-T, Stein N A and Moore F E (1979) Whole-body Single-photon Emission Computed Tomography using Dual, Large-field-of-view Scintillation Cameras *Phys Med Biol* 24 1123–1143
33. Juni J (1994) Taking Brain SPECT Seriously: Reflections on Recent Clinical Reports in The Journal of Nuclear Medicine *J Nucl Med* 35 1891–1895
34. Kadrmas D J, Frey E C and Tsui B M W (1997) Analysis of the Reconstructibility and Noise Properties of Scatter Photons in $^{99m}$Tc SPECT *Phys Med Biol* 42 2493–2516

35. Kadrmas D J, Frey E C, Karimi S S and Tsui B M W (1998) Fast implementations of reconstruction-based scatter compensation in fully 3D SPECT image reconstruction *Phys Med Biol* 43 857–873
36. Kaplan M S, Miyaoka R S, Kohlmyer S K, Haynor D R, Harrison R L and Lewellen T K (1996) Scatter and Attenuation Correction for In-111 Imaging Using Energy Spectrum Fitting *Med Phys* 23 1277–1285
37. Karbe H, Kertesz A, Davis J, Kemp B J, Prato F S and Nicholson R L (1994) Quantification of functional deficit in Alzheimer's disease using a computer-assisted mapping program for $^{99m}$Tc-HMPAO SPECT *Neuroradiology* 36 1–6
38. Kemp B J, Prato F S, Nicholson R L and Reese L (1995) Transmission Computed Tomography Imaging of the Head with a SPECT System and a Collimated Line Source *J Nucl Med* 36 328–335
39. Lange K and Carson R (1984) E M Reconstruction Algorithms for Emission and Transmission Tomography *J Comp Assist Tomo* 8 306–316
40. Lassen N A, Anderson A R, Friberg L and Paulson O B (1988) The Retention of 99mTc-d,I-HM-PAO in the human brain after intracarotid bolus injection: a kinetic analysis *J Cereb Blood Flow Metab* 8 S13–S22
41. Leveille J, Demonceau G and Walovitch R C (1992) Intrasubject comparison between technetium-99m-ECD and technetium-99m-HMPAO in healthy human subjects *J Nucl Med* 33 480–484
42. Licho R, Glick S J, Xia W, Pan T-S, Penney B C and King M A (1999) Attenuation Compensation in 99mTc SPECT Brain Imaging: A Comparison of the Use of Attenuation Maps Derived from Transmission Versus Emission Data in Normal Scans *J Nucl Med* 40 456–463
43. Mangin J F, Frouin V, Bloch I, Bendriem B and Lopez-Krahe J (1994) Fast nonsupervised three-dimensional registration of PET and MR images of the brain *J Cereb Blood Flow Metab* 14 749–762
44. Malko J A, Van Heertum R L, Gullberg G T and Kowalsky W P (1986) SPECT liver imaging using an iterative attenuation correction and an external flood source *J Nucl Med* 27 701–705
45. Matsunari I, Boning G. Ziegler S I, Kosa I, Nekolla S G, Ficaro E P and Schwaiger M (1998) Effects of Misalignment Between Transmission and Emission Scans on Attenuation-Corrected Cardiac SPECT *J Nucl Med* 39 411–416
46. McIntosh A R, Bookstein F L, Haxby J V and Grady C L (1996) Spatial Pattern Analysis of Functional Brain Images Using Partial Least Squares *Neuroimage* 3 143–157
47. McCord M E, Bacharach S L, Bonow R O, Dilsizian V, Cuocolo A and Freedman N (1992) Misalignment Between PET Transmission and Emission Scans: Its Effects on Myocardial Imaging *J Nucl Med* 33 1209–1214
48. Meikle S R, Dahlbom M and Cherry S R (1993) Attenuation Correction Using Count-Limited Transmission Data in Positron Emission Tomography *J Nucl Med* 34 143–150
49. Meikle S R, Hutton B F and Bailey D L (1994) A Transmission-Dependent Method for Scatter Correction in SPECT *J Nucl Med* 35 360–367
50. Mielke R, Pietrzyk U, Jacobs A, Fink G R, Ichimiya A, Kessler J, Herholz K and Heiss W D (1994) HMPAO SPET and FDG PET in Alzheimer's disease and vascular dementia: comparison of perfusion and metabolic pattern *Eur J Nucl Med* 21 1052–1060
51. Minoshima S, Berger K L, Lee K S and Mintun M A (1992) An Automated Method for Rotational Correction and Centering of Three-Dimensional Functional Brain Images *J Nucl Med* 33 1579–1585
52. Minoshima S, Koeppe R A, Frey K A and Kuhl D E (1994) Anatomic Standardization: Linear Scaling and Nonlinear Warping of Functional Brain Images *J Nucl Med* 35 1528–1537
53. Msaki P, Prato F S, Stodilka R Z, Davis J, Kemp B J, Kertesz A and Nicholson R L (1998) The Merits of Fully-Automated rCBF Determination in Eliminating Subjective Errors in Quantitative SPECT [Abstract] *J Nucl Med* 39 106P
54. Natterer F (1993) Determination of tissue attenuation in emission tomography of optically dense media *Inverse Problems* 9 731–736
55. Nelder J A and Mead R (1965) A Simplex method for function minimization *Comput J* 7 308–313
56. Nunez J and Llacer J (1990) A Fast Bayesian Reconstruction Algorithm for Emission Tomography with Entropy Prior Converging to Feasible Images *IEEE Trapis Med Imag* 9 159–171
57. Panin V Y, Zeng G L and Gullberg G T (1998) Reconstructions of Truncated Projections Using an Optimal Basis Expansion Derived from the Cross-Correlation of a "Knowledge Set" of a priori Cross-Sections *IEEE Trans Nucl Sci* 45 2119–2125
58. Panin V Y, Zeng G L and Gullberg G T (1999) Registration Problem in Attenuation Map Estimation using only Emission Data with Data Consistency Conditions [Abstract] *J Nucl Med* 40 294P
59. Pellizari C A, Chen G T Y, Spelbring D R, Weichselbaum R R and Chen C-T (1989) Accurate Three-Dimensional Registration of CT, PET, and/or MR Images of the Brain *J Comp Assist Tomo* 13 20–26
60. Patterson J C, Early T S, Martin A, Walker M Z, Russell J M and Villanueva-Meyer H (1997) SPECT Image Analysis Using Statistical Parametric Mapping: Comparison of Technetium-99m-HMPAO and Technetium-99m-ECD *J Nucl Med* 38 1721–1725
61. Phillips R L, London E D, Links J M and Cascella N G (1990) Program for PET Image Alignment: Effects on Calculated Differences in Cerebral Metabolic Rates for Glucose *J Nucl Med* 31 2052–2057
62. Pietrzyk U, Herholz K, Fink G, Jacobs A, Mielke R, Slansky I, Wurker M and Heiss W-D (1994) An Interactive Technique for Three-Dimensional Image Registration: Validation for PET, SPECT, MRI and CT Brain Studies *J Nucl Med* 35 2011–2018
63. Rosenthal M S, Cullom J, Hawkins W, Moore S C, Tsui B M W and Yester M (1995) Quantitative SPECT Imaging: A Review and Recommendations by the Focus Committee of the Society of Nuclear Medicine Computer and Instrumentation Council *J Nucl Med* 36 1489–1513
64. Seibyl J P, Woods S W, Zoghbi S S, Baldwin R M, Dey H M, Goddard AW, Zea-Ponce Y, Zubal G, Germine M, Smith E O, Heninger G R, Charney D S, Kung H F, Alavi A, Hoffer P B and Innis R B (1992) Dynamic SPECT Imaging of Dopamine D2 Receptors in Human Subjects with Iodine-123-IBZM *J Nucl Med* 33 1964–1971
65. Shepp L A and Vardi Y (1982) Maximum likelihood reconstruction for emission tomography *IEEE Trans Med Imag* 1 113–122
66. Slomka P J, Hurwitz G, Stephenson J A and Cradduck T D (1995) Automated alignment and sizing of myocardial stress and rest scans to three-dimensional normal templates using an image registration algorithm: a method for reproducible quantification *J Nucl Med* 36 1115–1122
67. Stodilka R Z, Kemp B J, Prato F S and Nicholson R L (1998a) Importance of Bone Attenuation in Brain SPECT Quantification *J Nucl Med* 39 190–197

68. Stodilka R Z, Kemp B J, Msaki P, Prato F S and Nicholson R L (1998b) The Relative Contributions of Scatter and Attenuation Corrections toward improved brain SPECT Quantification *Phys Med Biol* 43 2991–3008
69. Stodilka R Z, Kemp B J, Msaki P, Prato F S and Nicholson R L (1998c) Retrospective Scatter and Attenuation Correction by Inferring Anatomy from a Head Atlas *IEEE Medical Imaging Conference* [Abstract]
70. Stokking R, van Isselt J W, van Rijk P P, de Klerk J M H, Huiskes W L C, Mertens I J R. Buskens E and Viergever M A (1999) Integrated Visualization of Functional and Anatomic Brain Data: A Validation Study *J Nucl Med* 40 311–316
71. Sugiura M, Kawashima R, Sadato N, Senda M, Kanno I, Oda K, Sato K, Yonekura Y and Fukuda H (1999) Anatomic Validation of Spatial Normalization Methods for PET *J Nucl Med* 40 317–322
72. Talairach J, Tournoux P and Rayport M, eds (1988) *Co-planar stereotaxic atlas of the human brain, Three-dimensional proportional system: an approach to cerebral imaging* New York: Thieme Inc 1–122
73. Tan P, Bailey D L, Meikle S R, Eberl S, Fulton R R and Hutton B F (1993) A scanning line source for simultaneous emission and transmission measurements in SPECT *J Nucl Med* 34 1752–1760
74. Ter-Pogossian M M (1992) Misalignment Between PET Transmission and Emission Scans: Effect on Myocardial Imaging *J Nucl Med* 33 1214–1215
75. Tsao J, Stundzia A and Ichise M (1998) Fully Automated Establishment of Stereotaxic Image Orientation in Six Degrees of Freedom for Technetium-99m-ECD Brain SPECT *J Nucl Med* 39 503–508
76. Tsui B M W, Gullberg G T, Edgerton E R, Ballard J G, Perry J R, McCartney W H and Berg J (1989) Correction of Nonuniform Attenuation in Cardiac SPECT Imaging *J Nucl Med* 30 497–507
77. Tung C-H and Gullberg G T (1994) A simulation of emission and transmission noise propagation in cardiac SPECT imaging with nonuniform attenuation correction *Med Phys* 21 1565–1576
78. Tung C-H, Gullberg G T, Zeng G L, Christian P E, Datz F L and Morgan H T (1992). Nonuniform attenuation correction using simultaneous transmission and emission converging tomography *IEEE Trans Nucl Sci* 39 1134–1143
79. Van Dyck C H, Lin H, Smith E O, Wisniewski G, Cellar J, Robinson R, Narayan M, Bennett A, Delaney R C, Bronen R A and Hoffer P B (1996) Comparison of Technetium-99m-HMPAO and Technetium-99m-ECD Cerebral SPECT Images in Alzheimer's Disease *J Nucl Med* 37 1749–1755
80. Webb S, Flower M A, Ott R J and Leach M O (1983) A comparison of attenuation correction methods for quantitative single photon emission computed tomography *Phys Med Biol* 28 1045–1056
81. Welch A, Clack R, Natterer F, and Gullberg G T (1997) Toward accurate attenuation correction in SPECT without transmission measurements *IEEE Trans Med Imag* 16 532–541
82. Woods K and Bowyer K W (1997) Generating ROC Curves for Artificial Neural Networks *IEEE Trans Med Imag* 16 329–337
83. Woods R P, Cherry S R and Mazziotta J C (1992) Rapid Automated Algorithm for Aligning and Reslicing PET Images *J Comp Assist Tomo* 16 620–633
84. Woods R P, Mazziotta J C and Cherry S R (1993) MRI-PET Registration with Automated Algorithm *J Comp Assist Tomo* 17 536–546
85. Xu E Z, Mullani N A, Gould K L and Anderson W L (1991) A Segmented Attenuation Correction for PET *J Nucl Med* 32 161–165
86. Zubal I G, Spencer S S, Imam K, Seibyl J, Smith E O, Wisniewski G and Hoffer P B (1995) Difference Images Calculated from Ictal and Interictal Technetium-99m-HMPAO SPECT Scans of Epilepsy *J Nucl Med* 36 684–689
87. Zubal I G, Harell C R, Smith E O, Rattner Z, Gindi G R and Hoffer P B (1994) Computerized three-dimensional segmented human anatomy *Med Phys* 21 299–302

What is claimed is:

1. A method of applying scatter and attenuation correction to emission tomography images of a region of interest of a subject under observation comprising the steps of:
    aligning a three-dimensional computer model in the form of a two-component atlas representing the density distribution within said region of interest with said emission tomography images, said computer model being created from image data of other subjects thereby to avoid the need to image said subject under observation to create said computer model; and
    applying scatter and attenuation correction to said emission tomography images using said aligned computer model as a guide.

2. The method of claim 1 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

3. The method of claim 2 wherein said functional component simulates a SPECT or PET scan of said region of interest and wherein said anatomical component simulates a transmission scan of said region of interest.

4. The method of claim 3 wherein said region of interest is the head and wherein said functional component is the brain component of a head atlas.

5. The method of claim 3 wherein said region of interest is the heart, said functional component of said atlas simulating a cardiac image and said anatomical component of said atlas representing anatomical features of the thorax.

6. The method of claim 5 wherein the anatomical features of the thorax include:
    soft-tissues such as the heart, liver, muscle, and fat;
    very low-density soft-tissues such as the lungs; and
    high-density tissues such as bone and cartilage in the ribs and spine.

7. The method of claim 2 further comprising the step of selecting an atlas from a database of atlases prior to performing said aligning step.

8. The method of claim 7 wherein said selecting step is performed manually.

9. The method of claim 7 wherein said selecting step is performed automatically based on the degree of registration of each atlas in said database with said emission tomography images.

10. The method of claim 9 wherein the degree of registration is determined by:
    performing a preliminary reconstruction of each atlas; and
    registering the atlas to the preliminary reconstruction.

11. The method of claim 9 further comprising the step of combining multiple atlases to yield a resultant atlas that better registers with said emission tomography images.

12. The method of claim 7 wherein said database includes disease specific atlases, physical trait specific atlases and/or tracer or lesion specific atlases.

13. The method of claim 1 wherein said computer model is created from transmission images or x-ray CT scans of the region of interest of other subjects.

14. The method of claim 13 wherein said transmission images or x-ray CT scans are taken from a variety of other subjects and averaged thereby to create said computer model.

15. The method of claim 14 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

16. The method of claim 15 wherein said functional component simulates a SPECT or PET scan of said region of interest and wherein said anatomical component simulates a transmission scan of said region of interest.

17. An emission tomography imaging method where emission tomography images of a region of interest of a subject are taken for analysis and are corrected for scatter and attenuation, the method further comprising the step of:
using a three-dimensional computer model in the form of a two-component atlas approximating the density distribution within the region of interest as a guide to the application of scatter and attenuation correction, said computer model being created from image data of other subjects thereby to avoid the need to image said subject to create said computer model.

18. The emission tomography imaging method of claim 17 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

19. The emission tomography imaging method of claim 18 wherein said functional component simulates a SPECT or PET scan of said region of interest and wherein said anatomical component simulates a transmission scan of said region of interest.

20. The method of claim 17 wherein said computer model is created from transmission images or x-ray CT scans of the region of interest of other subjects.

21. The method of claim 20 wherein said transmission images or x-ray CT scans are taken from a variety of other subjects and averaged thereby to create said computer model.

22. The method of claim 21 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

23. The method of claim 22 wherein said functional component simulates a SPECT or PET scan of said region of interest and wherein said anatomical component simulates a transmission scan of said region of interest.

24. An emission tomography image processing system comprising:
memory storing emission tomography images of a region of interest of a subject under observation;
said memory also storing at least one three-dimensional computer model of said region of interest, said computer model being in the form of a two-component atlas and representing the density distribution within said region of interest, said computer model being created from image data of other subjects thereby to avoid the need to image said subject under observation to create said computer model; and
a processor for registering said computer model with said emission tomography images and for applying scatter and attenuation correction to said emission tomography images using said registered computer model as a guide.

25. An emission tomography image processing system as defined in claim 24 wherein said processor firstly registers a functional component of said atlas with said emission tomography images to generate a set of spatial transformation parameters and then registers an anatomical component of said atlas with said emission tomography images using said set of spatial transformation parameters.

26. An emission tomography image processing system as defined in claim 25 wherein said functional component simulates a SPECT or PET scan of said region of interest and wherein said anatomical component simulates a transmission scan of said region of interest.

27. An emission tomography image processing system as defined in claim 26 wherein said memory stores a database of atlases.

28. An emission tomography image processing system as defined in claim 27 wherein said processor selects an atlas from said database automatically based on the degree of registration of each atlas in said database with said emission tomography images.

29. An emission tomography image processing system as defined in claim 28 wherein said processor performs a preliminary reconstruction of each atlas and registers the atlas to the preliminary reconstruction to determine the degree of registration of each atlas.

30. An emission tomography image processing system as defined in claim 28 wherein said processor combines multiple atlases to yield a resultant atlas that better registers with said emission tomography images.

31. An emission tomography image processing system as defined in claim 27 wherein said database includes disease specific atlases, physical trait specific atlases and/or tracer or lesion specific atlases.

32. An emission tomography imaging system comprising:
means for taking emission tomography images of a region of interest of a subject under observation to form a three-dimensional image of said region of interest;
memory to store said emission tomography images, said memory also storing at least one three-dimensional computer model of said region of interest, said computer model being in the form of a two-component atlas and representing the density distribution within said region of interest, said computer model being created from image data of other subjects thereby to avoid the need to image said subject under observation to create said computer model; and
a processor for aligning said computer model with said emission tomography images and for applying scatter and attenuation correction to said emission tomography images using said aligned computer model as a guide.

33. A computer readable medium including computer program code for applying scatter and attenuation correction to emission tomography images of a region of interest of a subject under observation, said computer readable medium including:
computer program code for aligning a three-dimensional computer model representing the density distribution within said region of interest with said emission tomography images, said computer modes being created from image data of other subjects thereby to avoid the need to image said subject under observation to create said computer model; and computer program code for applying scatter and attenuation corrections to said emission tomography images using said aligned computer model as a guide, wherein said computer program code for aligning includes:

computer program code for aligning a functional component of said computer model simulating a SPECT or PET scan of said region of interest and for generating a set of spatial transformation parameters; and computer program code for aligning an anatomical component of said computer model simulating a transmission scan of said region of interest using said set of spatial transformation parameters.

34. A method of applying scatter and attenuation correction to emission tomography images of a region of interest of a subject under observation comprising the steps of:

aligning a three-dimensional computer model in the form of a two-component atlas representing the density distribution within said region of interest with said emission tomography images; and applying scatter and attenuation correction to said emission tomography images using said aligned computer model as a guide.

35. The method of claim 34 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

36. The method of claim 35 wherein said functional component simulates a SPECT or PET scan of said region of interest and wherein said anatomical component simulates a transmission scan of said region of interest.

37. The method of claim 36 further comprising the step of selecting an atlas from a database of atlases prior to performing said aligning step.

38. The method of claim 34 wherein said computer model is created from transmission images or x-ray CT scans of the region of interest of other subjects.

39. The method of claim 38 wherein said transmission images or x-ray CT scans are taken from a variety of other subjects and averaged thereby to create said computer model.

40. An emission tomography imaging method where emission tomography images of a region of interest of a subject are taken for analysis and are corrected for scatter and attenuation, the method further comprising the step of:

using a three-dimensional computer model in the form of a two-component atlas approximating the density distribution within the region of interest as a guide to the application of scatter and attenuation correction.

41. The emission tomography imaging method of claim 40 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

42. The emission tomography imaging method of claim 41 wherein said functional component simulates a SPECT or PET scan of said region of interest and wherein said anatomical component simulates a transmission scan of said region of interest.

43. An emission tomography image processing system comprising:

memory storing emission tomography images of a region of interest of a subject;

said memory also storing at least one three-dimensional computer model of said region of interest, said computer model being a two-component atlas representing the density distribution within said region of interest; and a processor for registering said computer model with said emission tomography images and for applying scatter and attenuation correction to said emission tomography images using said registered computer model as a guide.

44. An emission tomography image processing system as defined in claim 43 wherein said processor firstly registers a functional component of said atlas with said emission tomography images to generate a set of spatial transformation parameters and then registers an anatomical component of said atlas with said emission tomography images using said set of spatial transformation parameters.

45. An emission tomography image processing system as defined in claim 44 wherein said functional component simulates a SPECT or PET scan of said region of interest and wherein said anatomical component simulates a transmission scan of said region of interest.

46. An emission tomography image processing system as defined in claim 45 wherein said memory stores a database of atlases.

47. The method of claim 43 wherein said computer model is created from transmission images or x-ray CT scans of the region of interest of other subjects.

48. The method of claim 47 wherein said transmission images or x-ray CT scans are taken from a variety of other subjects and averaged thereby to create said computer model.

49. An emission tomography imaging method comprising the steps of:

obtaining emission tomography images of a region of interest of a subject under observation;

aligning a three-dimensional computer model in the form of a two-component atlas representing the density distribution within said region of interest with said emission tomography images without requiring said subject to be imaged to create said computer model; and applying scatter and attenuation correction to said emission tomography images using said aligned computer model as a guide.

50. The method of claim 49 wherein during said aligning step, a functional component of said atlas is firstly aligned with said emission tomography images to generate a set of spatial transformation parameters and thereafter, an anatomical component of said atlas is aligned with said emission tomography images using said set of spatial transformation parameters.

51. The method of claim 50 wherein said functional component simulates a SPECT or PET scan of said region of interest and wherein said anatomical component simulates a transmission scan of said region of interest.

52. The method of claim 51 wherein said region of interest is the head and wherein said functional component is the brain component of a head atlas.

53. The method of claim 51 wherein said region of interest is the heart, said functional component of said atlas simulating a cardiac image and said anatomical component of said atlas representing anatomical features of the thorax.

54. The method of claim 53 wherein the anatomical features of the thorax include:
- soft-tissues such as the heart, liver, muscle, and fat;
- very low-density soft-tissues such as the lungs; and
- high-density tissues such as bone and cartilage in the ribs and spine.

55. The method of claim 50 further comprising the step of selecting an atlas from a database of atlases prior to performing said aligning step.

56. The method of claim 55 wherein said selecting step is performed manually.

57. The method of claim 55 wherein said selecting step is performed automatically based on the degree of registration of each atlas in said database with said emission tomography images.

58. The method of claim 57 wherein the degree of registration is determined by:
- performing a preliminary reconstruction of each atlas; and
- registering the atlas to the preliminary reconstruction.

59. The method of claim 57 further comprising the step of combining multiple atlases to yield a resultant atlas that better registers with said emission tomography images.

60. The method of claim 55 wherein said database includes disease specific atlases, physical trait specific atlases and/or tracer or lesion specific atlases.

* * * * *